(12) United States Patent
Chae et al.

(10) Patent No.: US 12,422,648 B2
(45) Date of Patent: Sep. 23, 2025

(54) IMAGING LENS SYSTEM

(71) Applicant: Samsung Electro-Mechanics Co., Ltd., Suwon-si (KR)

(72) Inventors: Kyu Min Chae, Suwon-si (KR); Hyuk Joo Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 789 days.

(21) Appl. No.: 17/186,334

(22) Filed: Feb. 26, 2021

(65) Prior Publication Data

US 2022/0066170 A1 Mar. 3, 2022

(30) Foreign Application Priority Data

Aug. 25, 2020 (KR) .................. 10-2020-0107243

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .. G02B 13/0045; G02B 9/64; G02B 13/0015; G02B 3/0087; G02B 2003/0093; G02B 13/005; G02B 13/00; G02B 3/00; G02B 7/028; G03B 9/02; G03B 21/53; G03B 21/147
USPC ......................................... 359/754, 708–712
See application file for complete search history.

(56) References Cited

U.S. PATENT DOCUMENTS

| | | | |
|---|---|---|---|
| 11,947,088 B2* | 4/2024 | Chen | G02B 13/0045 |
| 2013/0094095 A1* | 4/2013 | Minefuji | G02B 13/16 |
| | | | 359/680 |
| 2017/0192200 A1 | 7/2017 | Hsieh et al. | |
| 2019/0094495 A1 | 3/2019 | Amano et al. | |
| 2019/0094533 A1 | 3/2019 | Nagatoshi et al. | |
| 2019/0302428 A1 | 10/2019 | Chen et al. | |
| 2020/0057280 A1 | 2/2020 | Kosuge | |
| 2020/0218036 A1* | 7/2020 | Liu | G02B 13/0035 |
| 2020/0241243 A1 | 7/2020 | Hirano | |
| 2020/0249437 A1* | 8/2020 | Hirano | G02B 13/0045 |
| 2020/0393653 A1* | 12/2020 | Chen | G02B 9/64 |

(Continued)

FOREIGN PATENT DOCUMENTS

| CN | 105182507 | * 12/2015 | ............. G02B 13/06 |
|---|---|---|---|
| CN | 105182507 A | 12/2015 | |
| CN | 107102422 | * 8/2017 | ............. G02B 1/041 |

(Continued)

OTHER PUBLICATIONS

English translation of CN105182507, (Dec. 2015) (Year: 2015).*

(Continued)

*Primary Examiner* — Thomas K Pham
*Assistant Examiner* — Kuei-Jen L Edenfield
(74) *Attorney, Agent, or Firm* — NSIP Law

(57) ABSTRACT

An imaging lens system includes a first lens, a second lens, a third lens, a fourth lens, a fifth lens, a sixth lens, a seventh lens, an eighth lens, and a ninth lens disposed in order from an object side. One of the first to ninth lenses is a temperature compensation lens having positive refractive power and having an absolute value of a refractive index temperature coefficient of 10 ($10^{-6}$/° C.) or less.

15 Claims, 16 Drawing Sheets

(56) References Cited

U.S. PATENT DOCUMENTS

2022/0066170 A1  3/2022  Chae et al.

FOREIGN PATENT DOCUMENTS

| CN | 111142235 A | 5/2020 |
| CN | 111239970 A | 6/2020 |
| CN | 111487748 A | 8/2020 |
| CN | 114114611 A | 3/2022 |
| JP | 2012-141464 A | 7/2012 |
| JP | 2017-102353 A | 6/2017 |
| JP | 2019-60971 A | 4/2019 |
| JP | 2019-60972 A | 4/2019 |
| TW | 201942621 A | 11/2019 |

OTHER PUBLICATIONS

English Translation of CN107102422 (Year: 2017).*
Chinese Office Action issued on Nov. 10, 2022, in counterpart Chinese Patent Application No. 202210424212.7 (5 pages in English, 6 pages in Chinese).
Notice of Reason for Rejection issued on Nov. 19, 2021, in counterpart Korean Patent Application No. 10-2020-0107243 (8 pages in English and 6 pages in Korean).
Chinese Office Action issued on Sep. 29, 2022, in counterpart Chinese Patent Application No. 202110717705.5 (4 pages in English and 6 pages in Chinese).
Taiwanese Office Action issued on Jan. 5, 2022, in counterpart Taiwanese Patent Application No. 110108122 (4 pages in English and 4 pages in Mandarin).

* cited by examiner

IMAGING LENS SYSTEM

CROSS-REFERENCE TO RELATED APPLICATIONS

This application claims the benefit under 35 USC 119(a) of Korean Patent Application No. 10-2020-0107243 filed on Aug. 25, 2020, in the Korean Intellectual Property Office, the entire disclosure of which is incorporated herein by reference for all purposes.

BACKGROUND

1. Field

The present disclosure relates to an imaging lens system which may implement constant optical performance irrespective of a change in temperature of a surrounding environment.

2. Description of the Background

A small-sized surveillance camera may be configured to capture images or video information in a surveillance area. For example, a small-sized surveillance camera may be mounted on a front bumper, a rear bumper, or the like, of a vehicle, to provide a driver with captured images or video.

Since early small-sized surveillance cameras were configured to image an obstacle adjacent to a vehicle, they had relatively low resolution and made significant changes in resolution depending on a temperature change from −40° C. to +80° C. However, as an autonomous driving function of a vehicle is increasingly required, there is demand for development of a surveillance camera which may implement constant optical characteristics even under severe temperature conditions while having high resolution.

The above information is presented as background information only to assist in an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an imaging lens system includes a first lens, a second lens, a third lens, a fourth lens, a fifth lens, a sixth lens, a seventh lens, an eighth lens, and a ninth lens disposed in order from an object side. One of the first to ninth lenses is a temperature compensation lens having positive refractive power and having an absolute value of a refractive index temperature coefficient of 10 ($10^{-6}$/° C.) or less.

The imaging lens system may further include a stop disposed between the third lens and the fourth lens.

The temperature compensation lens may be disposed on an image side of the stop.

The temperature compensation lens may have a greater refractive index than the other lenses.

Lenses adjacent to the temperature compensation lens each may have a refractive index temperature coefficient of less than −80 ($10^{-6}$/° C.).

A lens adjacent to an object side of the temperature compensation lens may have negative refractive power.

A composite focal length of the fourth lens and the fifth lens f45 may be less than a focal length of the imaging lens system f.

The seventh lens may have a convex image-side surface.

The eighth lens may have a convex object-side surface.

In another general aspect, an imaging lens system includes a first lens, a second lens, a third lens, a fourth lens, a fifth lens, a sixth lens, a seventh lens, an eighth lens, and ninth lens, disposed in order from an object side, and a stop disposed between the first lens and the ninth lens, wherein a composite focal length of two lenses continuously disposed on an image side of the stop fstp12 is greater than 0 and less than a focal length of the imaging lens system f.

The stop may be disposed between the third lens and the fourth lens.

The first lens may be a temperature compensation lens having positive refractive power and having an absolute value of a refractive index temperature coefficient of 10 ($10^{-6}$/° C.) or less.

The temperature compensation lens may have a refractive index of 1.7 or more.

An absolute value of a ratio of a sum of refractive index temperature coefficients of lenses disposed on an object side of the temperature compensation lens DTnF to ten times a refractive index temperature coefficient of the temperature compensation lens DTnC may be greater than 4.0 and less than 7.0.

An absolute value of a ratio of a sum of refractive index temperature coefficients of lenses disposed on an image side of the temperature compensation lens DTnR to ten times a refractive index temperature coefficient of the temperature compensation lens DTnC may be greater than 8.0 and less than 18.

The first lens may have negative refractive power.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
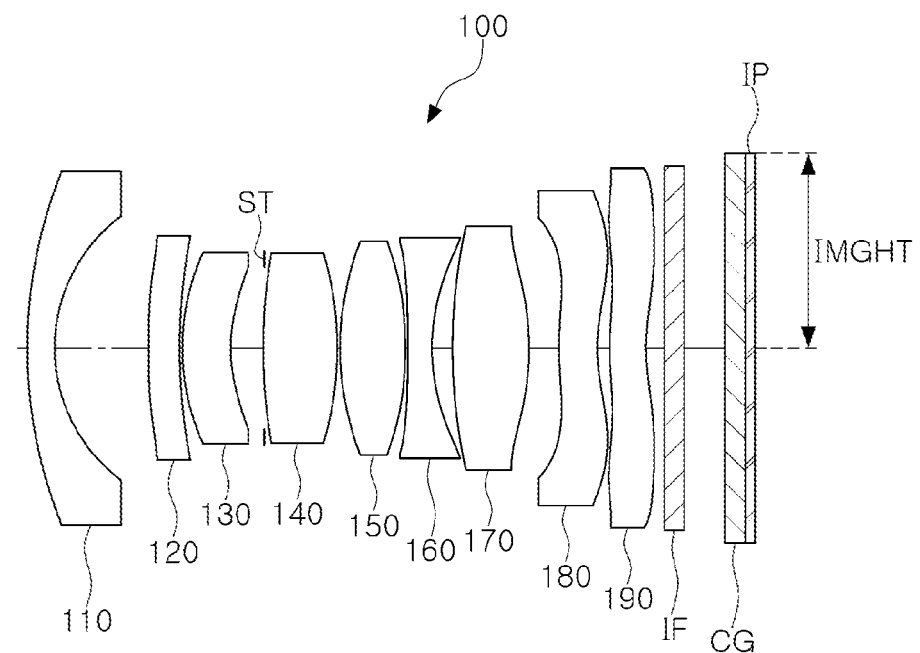
FIG. 1 is a view illustrating an imaging lens system according to a first example.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of functions and constructions that would be well known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Herein, it is noted that use of the term "may" with respect to an example or embodiment, for example, as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," "lower," and the like may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has"

specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure is to provide an imaging lens system which may implement constant optical characteristics, irrespective of a surrounding temperature.

An optical imaging system includes a plurality of lenses disposed along an optical axis. The plurality of lenses may be spaced apart from each other by predetermined distances along the optical axis.

For example, the optical imaging system may include a first lens, a second lens, a third lens, a fourth lens, a fifth lens, a sixth lens, a seventh lens, an eighth lens, and a ninth lens sequentially disposed in ascending numerical order along the optical axis from an object side of the optical imaging system toward an imaging plane of the optical imaging system, with the first lens being closest to the object side of the optical imaging system and the ninth lens being closest to the imaging plane.

In each lens, an object-side surface or a first surface is a surface of the lens closest to the object side of the optical imaging system, and an image-side surface or a second surface is a surface of the lens closest to the imaging plane.

Unless stated otherwise, a reference to a shape of a lens surface refers to a shape of a paraxial region of the lens surface. A paraxial region of a lens surface is a central portion of the lens surface surrounding and including the optical axis of the lens surface in which light rays incident to the lens surface make a small angle $\theta$ to the optical axis, and the approximations $\sin\theta \approx \theta$, $\tan\theta \approx \theta$, and $\cos\theta \approx 1$ are valid.

In the examples, a first lens refers to a lens most adjacent to an object (or a subject), and a ninth lens refers to a lens most adjacent to an imaging plane (or an image sensor). In the examples, units of a radius of curvature, a thickness, a TTL (a distance from an object-side surface of a first lens (or a frontmost lens) to an imaging plane), an IMGHT (half of a diagonal length of an imaging plane), and a focal length are indicated in millimeters (mm). A thickness of a lens, a gap between lenses, and a TTL refer to a distance of a lens in an optical axis. Also, in the descriptions of a shape of a lens, the configuration in which one surface is convex indicates that an optical axis region of the surface is convex, and the configuration in which one surface is concave indicates that an optical axis region of the surface is concave. Thus, even when it is described that one surface of a lens is convex, an edge of the lens may be concave. Similarly, even when it is described that one surface of a lens is concave, an edge of the lens may be convex.

The first lens has refractive power. For example, the first lens may have negative refractive power. One surface of the first lens may be convex. For example, the first lens may have a convex object-side surface. The first lens may have a spherical or aspherical surface. For example, both surfaces of the first lens may be spherical or aspherical. The first lens may be manufactured using a material having high light transmissivity and excellent workability. For example, the first lens may be manufactured using a plastic material. The first lens may have a predetermined refractive index. For example, the refractive index of the first lens may be less than 1.6.

The second lens has refractive power. For example, the second lens may have positive or negative refractive power. One surface of the second lens may be convex. For example, the second lens may have a convex object-side surface or an image-side surface. The second lens may have an aspherical surface. For example, both surfaces of the second lens may be aspherical. The second lens may be manufactured using a material having high light transmissivity and excellent workability. For example, the second lens may be manufactured using a plastic material. The second lens may have a predetermined refractive index. For example, the refractive index of the second lens may be less than 1.6.

The third lens has refractive power. For example, the third lens may have negative refractive power. One surface of the third lens may be convex. For example, the third lens may have a convex object-side surface. The third lens may have an aspherical surface. For example, both surfaces of the third lens may be aspherical. The third lens may be manufactured using a material having high light transmissivity and excellent workability. For example, the third lens may be manufactured using a plastic material. The third lens may have a greater refractive index than the first lens and the second lens. For example, the refractive index of the third lens may be 1.6 or more.

The fourth lens has refractive power. For example, the fourth lens may have positive refractive power. One surface of the fourth lens may be convex. For example, the fourth lens may have a convex object-side surface. The fourth lens may have a spherical surface or an aspherical surface. For example, both surfaces of the fourth lens may be spherical or aspherical. The fourth lens may be manufactured using a material having high light transmissivity and excellent workability. The fourth lens may have a predetermined refractive index. For example, the refractive index of the fourth lens may be 1.5 or more.

The fifth lens has refractive power. The fifth lens may have positive refractive power. One surface of the fifth lens may be convex. For example, the fifth lens may have a convex object-side surface or a convex mage-side surface. The fifth lens may have a spherical or aspherical surface. For example, both surfaces of the fifth lens may be spherical or aspherical. The fifth lens may be manufactured using a material having high light transmissivity and excellent workability. The fifth lens may have a predetermined refractive index. For example, the refractive index of the fifth lens may be 1.5 or more.

The sixth lens has refractive power. For example, the sixth lens may have negative refractive power. One surface of the sixth lens may be concave. For example, the sixth lens may have a concave object-side surface. The sixth lens may have an aspherical surface. For example, both surfaces of the sixth lens may be aspherical. The sixth lens may be manufactured using a material having high light transmissivity and excellent workability. For example, the sixth lens may be manufactured using a plastic material. The sixth lens may have a refractive index substantially similar to the refractive index of the third lens. For example, the refractive index of the sixth lens may be 1.6 or more.

The seventh lens has refractive power. For example, the seventh lens may have positive refractive power. One surface of the seventh lens may be convex. For example, the seventh lens may have a convex image-side surface. The seventh lens may have an aspherical surface. For example, both surfaces of the seventh lens may be aspherical. The seventh lens may be manufactured using a material having high light transmissivity and excellent workability. For example, the seventh lens may be manufactured using a plastic material. The seventh lens may have a refractive index substantially similar to the refractive index of the second lens. For example, the refractive index of the seventh lens may be less than 1.6.

The eighth lens has refractive power. For example, the eighth lens may have positive or negative refractive power. One surface of the eighth lens may be convex. For example, the eighth lens may have a convex object-side surface. The eighth lens may have an aspherical surface. For example, both surfaces of the eighth lens may be aspherical. An inflection point may be formed on at least one surface of the eighth lens. For example, at least one inflection point may be formed on the object-side surface and the image-side surface of the eighth lens. The eighth lens may be manufactured using a material having high light transmissivity and excellent workability. For example, the eighth lens may be manufactured using a plastic material. The eighth lens may have a refractive index substantially similar to the refractive index of the seventh lens. For example, the refractive index of the eighth lens may be less than 1.6.

The ninth lens may have refractive power. For example, the ninth lens may have negative refractive power. One surface of the ninth lens may be concave. For example, the ninth lens may have a concave image-side surface. The ninth lens may have an aspherical surface. For example, both surfaces of the ninth lens may be aspherical. An inflection point may be formed on at least one surface of the ninth lens. For example, at least one inflection point may be formed on the object-side surface and the image-side surface of the ninth lens. The ninth lens may be manufactured using a material having high light transmissivity and excellent workability. For example, the ninth lens may be manufactured using a plastic material. The ninth lens may have a refractive index substantially similar to the refractive index of the seventh lens. For example, the refractive index of the ninth lens may be less than 1.6.

Lenses, constituting an imaging lens system, may selectively have an aspherical surface. An aspherical surface of a lens may be represented by Equation 1, as below:

$$Z = \frac{cr^2}{1 + 1 - (1+k)c^2 r^2} + Ar^4 + Br^6 + Cr^8 + Dr^{10} + Er^{12} + Fr^{14} + Gr^{16} + \ldots$$ (Equation 1)

In Equation 1, "c" is an inverse of a radius of a curvature of a respective lens, "k" is a conic constant, "r" is a distance from a certain point on an aspherical surface of the lens to an optical axis, "A, B, C, D, E, F, and G" are aspheric constants, "Z" (or SAG) is a height from a certain point on an aspherical surface to an apex of the aspherical surface in an optical axis direction.

The imaging lens system may further include a filter, an image sensor, and a stop. In addition, the imaging lens system may further include a cover glass.

The filter may be disposed between the ninth lens and the image sensor. The filter may block light having some wavelengths. For example, the filter may block light having an infrared wavelength. The image sensor may have an imaging surface disposed at the imaging plane of the imaging lens system. The stop may be disposed to adjust the intensity of light incident to a lens. For example, the stop may be disposed between the third lens and the fourth lens. Lenses, disposed on an image side of the stop, may have a predetermined focal length. For example, a composite focal length fstp12 of two lenses, continuously disposed on the image side of the stop, may be greater than 0 to less than a focal length f of the imaging lens system. The cover glass may be disposed between the filter and the image sensor. For example, the cover glass may be formed to be in close contact with one surface of the image sensor. The cover glass may be configured to cover the image sensor. For example, the cover glass may cover the image sensor to prevent a foreign object from contaminating the imaging surface of the image sensor or to prevent a foreign object from coming into contact with the image sensor.

The first to ninth lenses have a predetermined refractive index temperature coefficient (refractive index change rate) on the order of $10^{-6}/°$ C. At least one of the first to ninth lenses may have a positive refractive index temperature coefficient. In addition, one of the first to ninth lenses may have a positive refractive index and an absolute value of a refractive index temperature coefficient of 10 ($10^{-6}/°$ C.) or less. The corresponding lens may serve as a temperature compensation lens in the imaging lens system. For example, the temperature compensation lens may reduce a change in back focal length (BFL) in response to a change in surrounding temperature. The temperature compensation lens may have a greater refractive index than the other lenses. For example, the refractive index of the temperature compensation lens may be 1.7 or more. The temperature compensation lens may be disposed in a specific position. For example, the temperature compensation lens may be disposed on an image side of the stop. Lenses, disposed in the vicinity of the temperature compensation lens, may have a significantly low refractive index temperature coefficient. For example, the refractive index temperature coefficient of lenses adjacent to the temperature compensation lens may be less than −80 ($10^{-6}/°$ C.). Lenses, disposed on one side of the temperature compensation lens, may have a specific refractive power. For example, a lens disposed on an object side of the temperature compensation lens may have negative refractive power.

The imaging lens system may satisfy one or more of the following conditional expressions.

$f45 < f$ $4.0 < |DTnF/(DTnC*10)| < 7.0$ $8.0 < |DTnR/(DTnC*10)| < 18$ $0.3 < DTnF/DTnR < 0.8$ $1.2 < f/IMGHT < 1.4$ $0.6 < f/fc < 1.3$

In the above conditional equations, f is the focal length of the imaging lens system, f45 is a composite focal length of the fourth and fifth lenses, DTnF is the sum of refractive index temperature coefficients of lenses disposed on an object side of the temperature compensation lens, DTnR is the sum of refractive index temperature coefficients of lenses disposed on an image side of the temperature compensation lens, DTnC is a refractive index temperature coefficient of the temperature compensation lens, IMGHT is a maximum effective image height of the optical imaging system and is equal to one half of a diagonal length of the effective imaging area of the imaging surface of the image sensor, and fc is a focal length of the temperature compensation lens.

The lenses, constituting the imaging lens system, may each have a predetermined coefficient of thermal expansion (CTE) on the order of $10^{-6}/°$ C. For example, a CTE of the first to ninth lenses may be 6.0 ($10^{-6}/°$ C.) or more to less than 80 ($10^{-6}/°$ C.).

The lenses, constituting the imaging lens system, may have a focal length change VT depending on temperature. The focal length variation VT of the lenses may be obtained through the following equation.

$$VTi=[DTni/(Ndi-1)-CTEi]^{-1}$$

In the above equation, VTi is a focal length change rate of an i-th lens, DTni is a refractive index change rate (refractive index temperature coefficient) of the i-th lens, Ndi is a refractive index of the i-th lens, and CTEi is a coefficient of thermal expansion (CTE) of the i-th lens. A focal length change rate VT of the compensation lens may be significantly small due to the other lenses. For example, the focal length change rate VT of the compensation lens may be −400 or less.

In the description below, various examples of an imaging lens system will be described.

Hereinafter, an imaging lens system 100 according to a first example will be described with reference to FIG. 1.

The imaging lens system 100 may include a first lens 110, a second lens 120, a third lens 130, a fourth lens 140, a fifth lens 150, a sixth lens 160, a seventh lens 170, an eighth lens 180, and a ninth lens 190.

The first lens 110 may have negative refractive power, and may have a convex object-side surface and a concave image-side surface. The second lens 120 may have positive refractive power, and may have a convex object-side surface and a concave image-side surface. The third lens 130 may have negative refractive power, and may have a convex object-side surface and a concave image-side surface. The fourth lens 140 may have positive refractive power, and may have a convex object-side surface and a convex image-side surface. The fifth lens 150 may have positive refractive power, and may have a convex object-side surface and a convex image-side surface. The sixth lens 160 may have negative refractive power, and may have a concave object-side surface and a concave image-side surface. The seventh lens 170 may have positive refractive power, and may have a convex object-side surface and a convex image-side surface. The eighth lens 180 may have negative refractive power, and may have a convex object-side surface and a concave image-side surface. The ninth lens 190 may have negative refractive power, and may have a convex object-side surface and a concave image-side surface.

The imaging lens system 100 may further include a filter IF, a cover glass CG, an image sensor IP, and a stop ST. The filter IF and the cover glass CG may be sequentially disposed between the ninth lens 190 and the image sensor IP. The stop ST may be disposed between the third lens 130 and the fourth lens 140.

Figure 2:
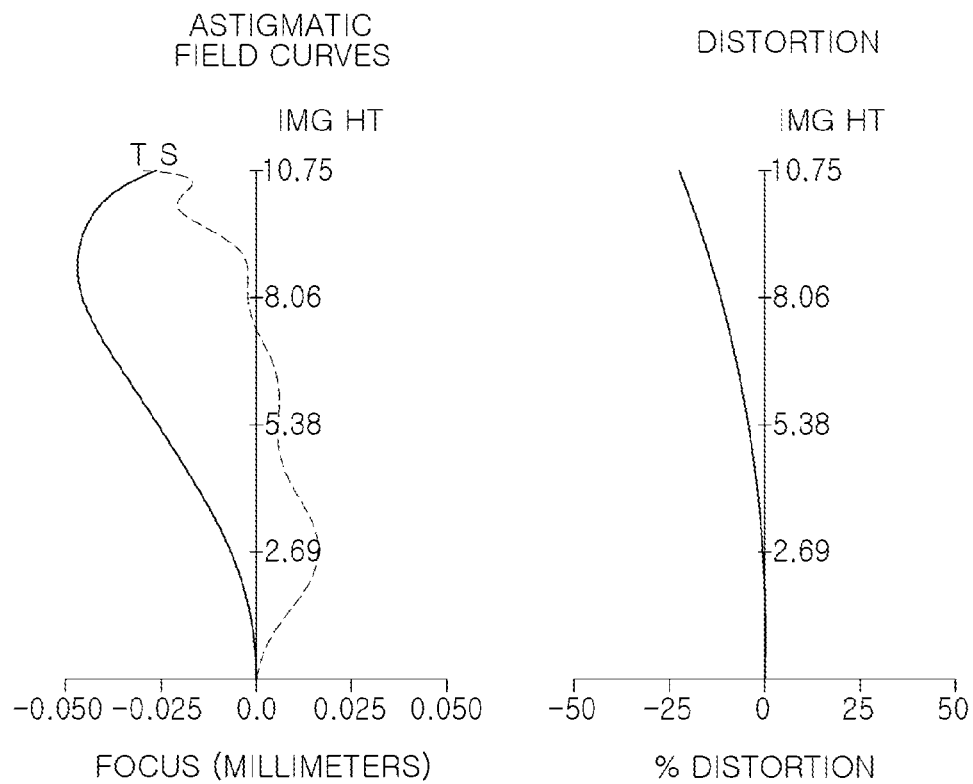
FIG. 2 is a view illustrating aberration curves of the imaging lens system illustrated in FIG. 1.
Figure 3:
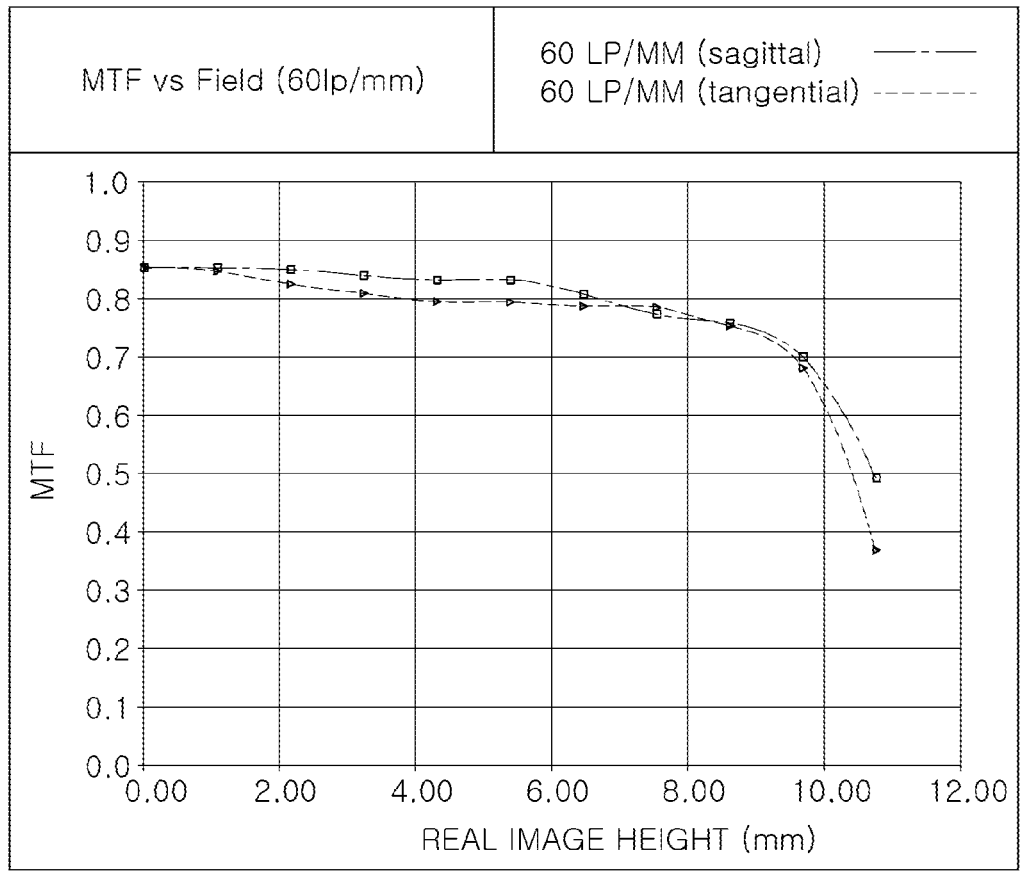
FIG. 3 is a graph illustrating Modulation Transfer Function (MTF) curves of the imaging lens system illustrated in FIG. 1.
Figure 4:
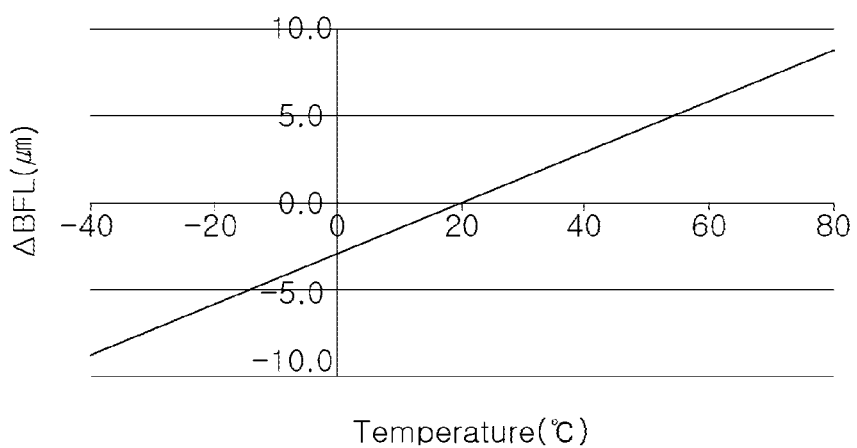
FIG. 4 is a graph illustrating a curve of a back focal length (BFL) depending on a change in temperature of the imaging lens system illustrated in FIG. 1.

FIGS. 2 and 3 illustrate aberration characteristics and MTF characteristics of the imaging lens system 100 according to the first example. FIG. 4 illustrates a change in a back focal length ΔBFL (μm) (microns) of the imaging lens system 100 depending on temperature.

Lens characteristics and aspherical values of the imaging lens system 100 according to the first example are listed in Tables 1 and 2. In the first example, a temperature compensation lens is a fourth lens having a refractive index change rate (refractive index temperature coefficient) (DTn) value of 4.40.

TABLE 1

| Surface No. | Note | Radius of Curvature | Thickness/ Distance | Refractive Index | Abbe Number | DTn ($10^{-6}/°$ C.) | CTE ($10^{-6}/°$ C.) | VT ($10^3$) |
|---|---|---|---|---|---|---|---|---|
| S1 | First lens | 26.144 | 1.500 | 1.5168 | 64.17 | 1.60 | 8.00 | −205.90 |
| S2 | | 9.096 | 5.171 | | | | | |
| S3 | Second Lens | 87.775 | 1.700 | 1.5365 | 55.91 | −93.30 | 60.00 | −4.30 |
| S4 | | 147.218 | 0.150 | | | | | |
| S5 | Third Lens | 10.427 | 2.660 | 1.6397 | 23.53 | −115.00 | 66.00 | −4.10 |
| S6 | | 8.188 | 1.852 | | | | | |
| S7 | Stop | Infinity | −0.056 | | | | | |
| S8 | Fourth Lens | 30.043 | 4.080 | 1.7680 | 49.24 | 4.40 | 5.90 | −5850 |
| S9 | | −18.334 | 0.152 | | | | | |
| S10 | Fifth Lens | 14.562 | 3.580 | 1.5365 | 55.91 | −93.30 | 60.00 | −4.30 |
| S11 | | −27.131 | 0.150 | | | | | |
| S12 | Sixth Lens | −148.371 | 1.330 | 1.6397 | 23.53 | −115.00 | 66.00 | −4.10 |
| S13 | | 10.908 | 1.129 | | | | | |
| S14 | Seventh lens | 33.914 | 4.200 | 1.5365 | 55.91 | −93.30 | 60.00 | −4.30 |
| S15 | | −17.089 | 1.648 | | | | | |
| S16 | Eighth Lens | 17.452 | 2.100 | 1.5365 | 55.91 | −93.30 | 60.00 | −4.30 |
| S17 | | 9.576 | 0.683 | | | | | |
| S18 | Ninth Lens | 16.19 | 2.020 | 1.5365 | 55.91 | −93.30 | 60.00 | −4.30 |
| S19 | | 11.111 | 1.000 | | | | | |
| S20 | Filter | Infinity | 1.100 | 1.5168 | 64.17 | 1.60 | 8.00 | −205.90 |
| S21 | | Infinity | 2.241 | | | | | |

TABLE 1-continued

| Surface No. | Note | Radius of Curvature | Thickness/ Distance | Refractive Index | Abbe Number | DTn (10⁻⁶/° C.) | CTE (10⁻⁶/° C.) | VT (10³) |
|---|---|---|---|---|---|---|---|---|
| S22 | Cover Glass | Infinity | 1.100 | 1.5168 | 64.17 | 1.60 | 8.00 | −205.90 |
| S23 | | Infinity | 0.010 | | | | | |
| S24 | Imaging Plane | Infinity | | | | | | |

TABLE 2

| Surface No. | K | A | B | C | D | E | F |
|---|---|---|---|---|---|---|---|
| S3 | 0 | 6.9600E−04 | −1.4500E−05 | −7.1900E−08 | 2.4100E−09 | — | — |
| S4 | 0 | 1.3700E−03 | −3.0600E−05 | −2.8900E−07 | 1.2300E−08 | — | — |
| S5 | 0 | −2.8600E−04 | −1.8300E−06 | −4.4600E−07 | 1.3900E−08 | — | — |
| S6 | 0 | −1.2800E−03 | 3.2800E−05 | −1.2900E−06 | 2.9800E−08 | — | — |
| S8 | 0 | −2.5500E−05 | 2.0500E−06 | −3.2000E−07 | 9.1300E−09 | — | — |
| S9 | 0 | 1.0700E−04 | −4.1300E−06 | 1.0500E−08 | 1.1500E−09 | — | — |
| S10 | 0 | −8.7800E−05 | −5.4700E−06 | 1.0200E−07 | 1.4300E−09 | — | — |
| S11 | 0 | −7.1400E−04 | 2.5400E−05 | −6.8200E−07 | 9.0100E−09 | — | — |
| S12 | 0 | −5.1800E−04 | 2.5500E−05 | −7.9900E−07 | 7.7400E−09 | — | — |
| S13 | 0 | −3.8500E−04 | 1.6400E−05 | −3.3300E−07 | 3.4700E−10 | — | — |
| S14 | 0 | −2.5600E−04 | 7.6400E−06 | 3.4400E−07 | −7.1500E−09 | −1.7300E−11 | — |
| S15 | 0 | −4.4300E−04 | 2.3700E−05 | −3.9500E−07 | 7.3800E−09 | −7.3600E−11 | — |
| S16 | 0 | −1.6500E−03 | 2.2700E−05 | −8.4900E−08 | −5.3100E−09 | 6.1200E−11 | — |
| S17 | 0 | −1.7600E−03 | 2.0100E−05 | −1.6700E−07 | 4.6400E−10 | −3.9700E−13 | — |
| S18 | 0 | −1.9200E−03 | 4.0900E−05 | −4.0300E−07 | 1.9100E−09 | −4.5200E−12 | 5.9900E−15 |
| S19 | 0 | −1.9500E−03 | 4.3600E−05 | −6.9000E−07 | 6.8200E−09 | −3.7800E−11 | 8.1300E−14 |

Figure 5:
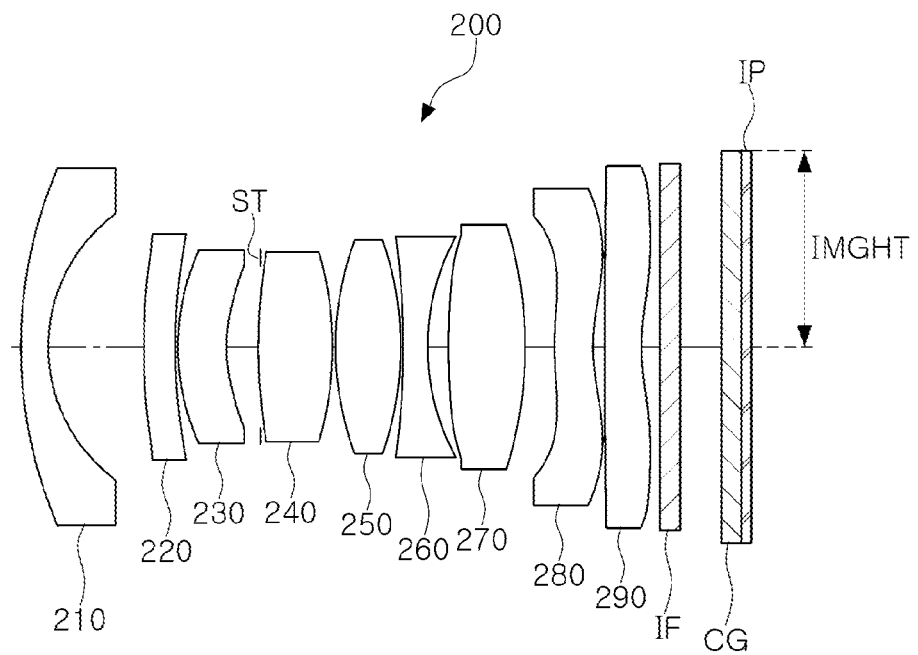
FIG. 5 is a view illustrating an imaging lens system according to a second example.

Hereinafter, an imaging lens system 200 according to a second example will be described with reference to FIG. 5.

The imaging lens system 200 may include a first lens 210, a second lens 220, a third lens 230, a fourth lens 240, a fifth lens 250, a sixth lens 260, a seventh lens 270, an eighth lens 280, and a ninth lens 290.

The first lens 210 may have negative refractive power, and may have a convex object-side surface and a concave image-side surface. The second lens 220 may have positive refractive power, and may have a convex object-side surface and a concave image-side surface. The third lens 230 may have negative refractive power, and may have a convex object-side surface and a concave image-side surface. The fourth lens 240 may have positive refractive power, and may have a convex object-side surface and a convex image-side surface. The fifth lens 250 may have positive refractive power, and may have a convex object-side surface and a convex image-side surface. The sixth lens 260 may have negative refractive power, and may have a concave object-side surface and a concave image-side surface. The seventh lens 270 may have positive refractive power, and may have a convex object-side surface and a convex image-side surface. The eighth lens 280 may have negative refractive power, and may have a convex object-side surface and a concave image-side surface. The ninth lens 290 may have negative refractive power, and may have a convex object-side surface and a concave image-side surface.

The imaging lens system 200 may further include a filter IF, a cover glass CG, an image sensor IP, and a stop ST. The filter IF and the cover glass CG may be sequentially disposed between the ninth lens 290 and the image sensor IP. The stop ST may be disposed between the third lens 230 and the fourth lens 240.

Figure 6:
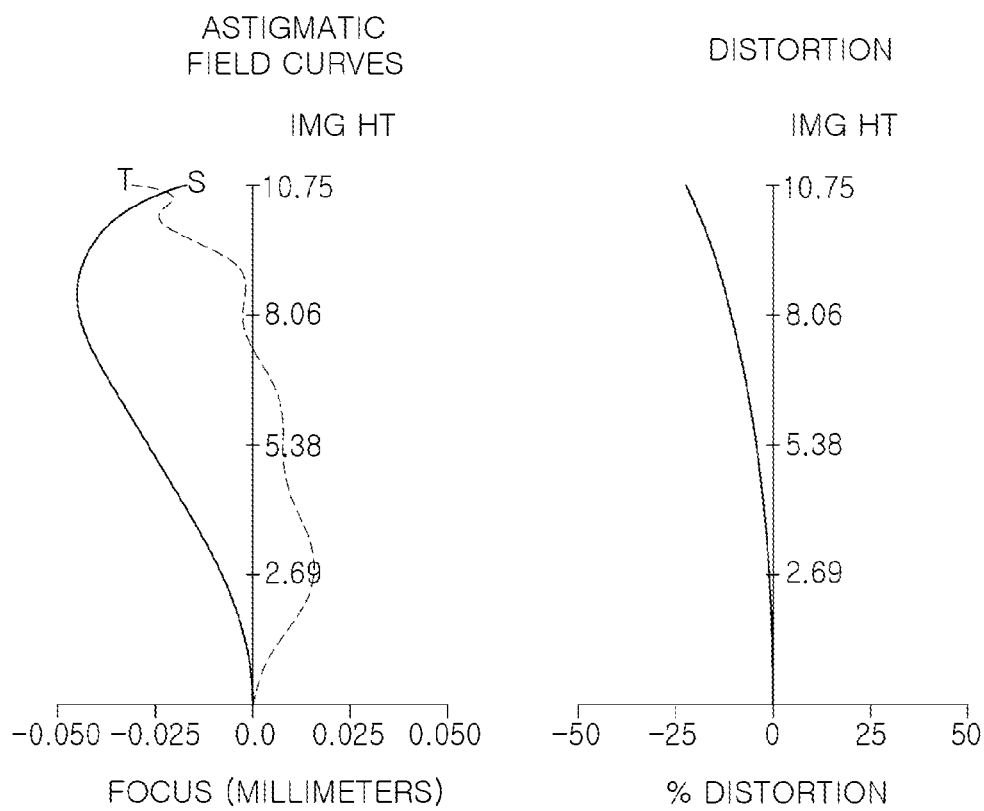
FIG. 6 is a view illustrating aberration curves of the imaging lens system illustrated in FIG. 5
Figure 7:
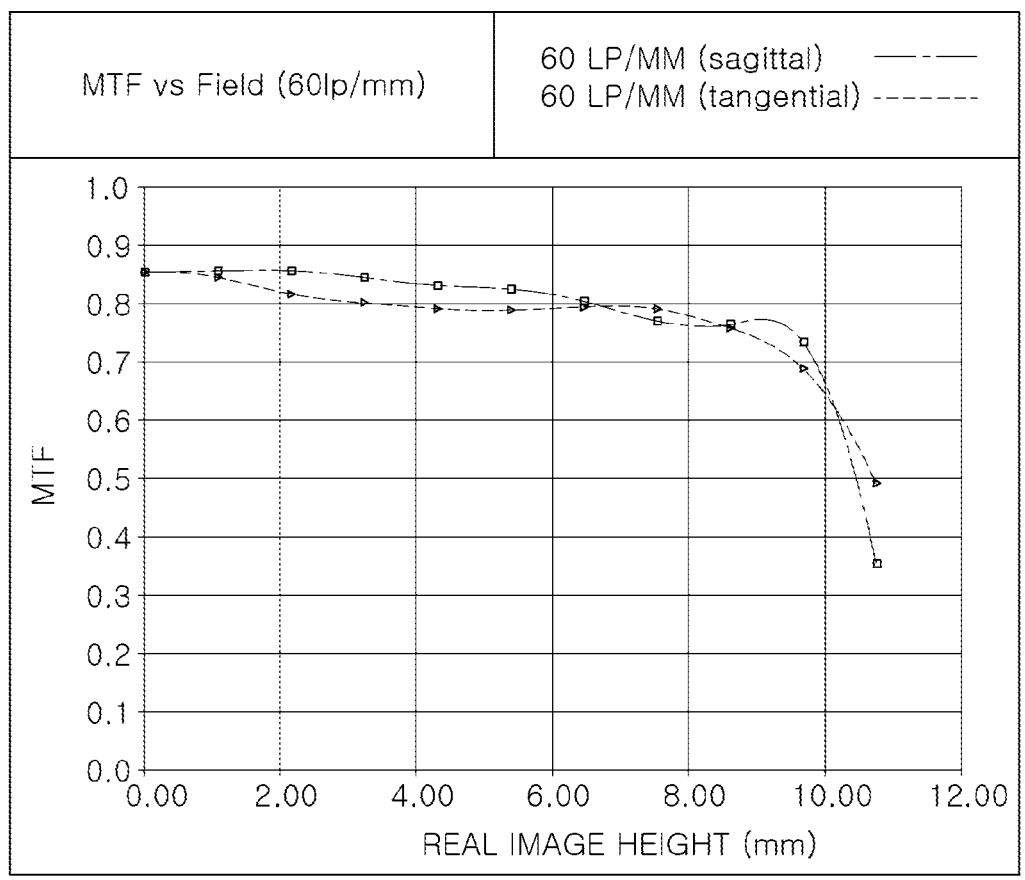
FIG. 7 is a graph illustrating MTF curves of the imaging lens system illustrated in FIG. 5.
Figure 8:
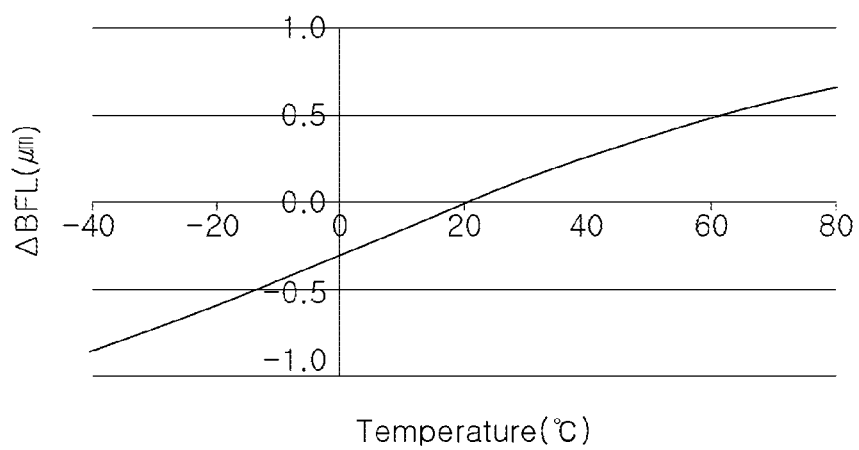
FIG. 8 is a graph illustrating a curve of a BFL depending on a change in temperature of the imaging lens system illustrated in FIG. 5.

FIGS. 6 and 7 illustrate aberration characteristics and MTF characteristics of the imaging lens system 200 according to the second example. FIG. 8 illustrates a change in back focal length ΔBFL (μm) of the imaging lens system 200 depending on temperature.

Lens characteristics and aspherical values of the imaging lens system 200 according to the second example are listed in Tables 3 and 4. In the second example, a temperature compensation lens is a fourth lens having a DTn value of 4.40.

| Surface No. | Note | Radius of Curvature | Thickness/ Distance | Refractive Index | Abbe Number | DTn (10⁻⁶/° C.) | CTE (10⁻⁶/° C.) | VT (10³) |
|---|---|---|---|---|---|---|---|---|
| S1 | First Lens | 24.778 | 1.500 | 1.5168 | 64.17 | 1.60 | 8.00 | −206.00 |
| S2 | | 9.094 | 5.242 | | | | | |
| S3 | Second Lens | 101.26 | 1.700 | 1.5365 | 55.91 | −93.30 | 60.00 | −4.00 |
| S4 | | 119.287 | 0.150 | | | | | |
| S5 | Third Lens | 10.451 | 2.660 | 1.6397 | 23.53 | −115.00 | 66.00 | −4.00 |
| S6 | | 8.208 | 1.842 | | | | | |
| S7 | Stop | Infinity | −0.107 | | | | | |
| S8 | Fourth Lens | 29.578 | 4.080 | 1.7680 | 49.24 | 4.40 | 5.90 | −5850 |

-continued

| Surface No. | Note | Radius of Curvature | Thickness/ Distance | Refractive Index | Abbe Number | DTn (10⁻⁶/° C.) | CTE (10⁻⁶/° C.) | VT (10³) |
|---|---|---|---|---|---|---|---|---|
| S9 | | −18.08 | 0.150 | | | | | |
| S10 | Fifth Lens | 14.714 | 3.580 | 1.5365 | 55.91 | −93.30 | 60.00 | −4.00 |
| S11 | | −26.57 | 0.150 | | | | | |
| S12 | Sixth Lens | −146.08 | 1.330 | 1.6397 | 23.53 | −115.00 | 66.00 | −4.00 |
| S13 | | 10.912 | 1.151 | | | | | |
| S14 | Seventh Lens | 35.836 | 4.200 | 1.5365 | 55.91 | −93.30 | 60.00 | −4.00 |
| S15 | | −16.375 | 1.612 | | | | | |
| S16 | Eighth Lens | 17.52 | 2.100 | 1.5365 | 55.91 | −93.30 | 60.00 | −4.00 |
| S17 | | 9.568 | 0.663 | | | | | |
| S18 | Ninth Lens | 15.845 | 2.020 | 1.5365 | 55.91 | −93.30 | 60.00 | −4.00 |
| S19 | | 10.916 | 1.000 | | | | | |
| S20 | Filter | Infinity | 1.100 | 1.5168 | 64.17 | 1.60 | 8.00 | −206.00 |
| S21 | | Infinity | 2.267 | | | | | |
| S22 | Cover Glass | Infinity | 1.100 | 1.5168 | 64.17 | 1.60 | 8.00 | −206.00 |
| S23 | | Infinity | 0.015 | | | | | |
| S24 | Imaging Plane | Infinity | | | | | | |

TABLE 4

| Surface No. | K | A | B | C | D | E | F |
|---|---|---|---|---|---|---|---|
| S3 | 0 | 7.1384E−04 | −1.5294E−05 | −5.8444E−08 | 2.2541E−09 | — | — |
| S4 | 0 | 1.3987E−03 | −3.1372E−05 | −2.9836E−07 | 1.2536E−08 | — | — |
| S5 | 0 | −2.8524E−04 | −2.0490E−06 | −4.4052E−07 | 1.4053E−08 | — | — |
| S6 | 0 | −1.2798E−03 | 3.2463E−05 | −1.2826E−06 | 3.0271E−08 | — | — |
| S8 | 0 | −2.3005E−05 | 1.7235E−06 | −3.2494E−07 | 9.4242E−09 | — | — |
| S9 | 0 | 1.0748E−04 | −3.9703E−06 | 9.8215E−09 | 1.1364E−09 | — | — |
| S10 | 0 | −1.0462E−04 | −5.1941E−06 | 1.1343E−07 | 1.3676E−09 | — | — |
| S11 | 0 | −7.1910E−04 | 2.5495E−05 | −6.9616E−07 | 9.3772E−09 | — | — |
| S12 | 0 | −4.9578E−04 | 2.5129E−05 | −8.1926E−07 | 8.0481E−09 | — | — |
| S13 | 0 | −3.7098E−04 | 1.5410E−05 | −3.0412E−07 | −4.3545E−11 | — | — |
| S14 | 0 | −2.4557E−04 | 6.6006E−06 | 3.7419E−07 | −6.9397E−09 | −2.9975E−11 | — |
| S15 | 0 | −4.4713E−04 | 2.4257E−05 | −4.3593E−07 | 8.6957E−09 | −8.6540E−11 | — |
| S16 | 0 | −1.6541E−03 | 2.2847E−05 | −9.2817E−08 | −5.2843E−09 | 6.2342E−11 | — |
| S17 | 0 | −1.7574E−03 | 2.0250E−05 | −1.7972E−07 | 6.7875E−10 | −1.6113E−12 | — |
| S18 | 0 | −1.9079E−03 | 4.0724E−05 | −4.0409E−07 | 1.9935E−09 | −5.5138E−12 | 9.3113E−15 |
| S19 | 0 | −1.9344E−03 | 4.2892E−05 | −6.7719E−07 | 6.6814E−09 | −3.6985E−11 | 7.8129E−14 |

Figure 9:
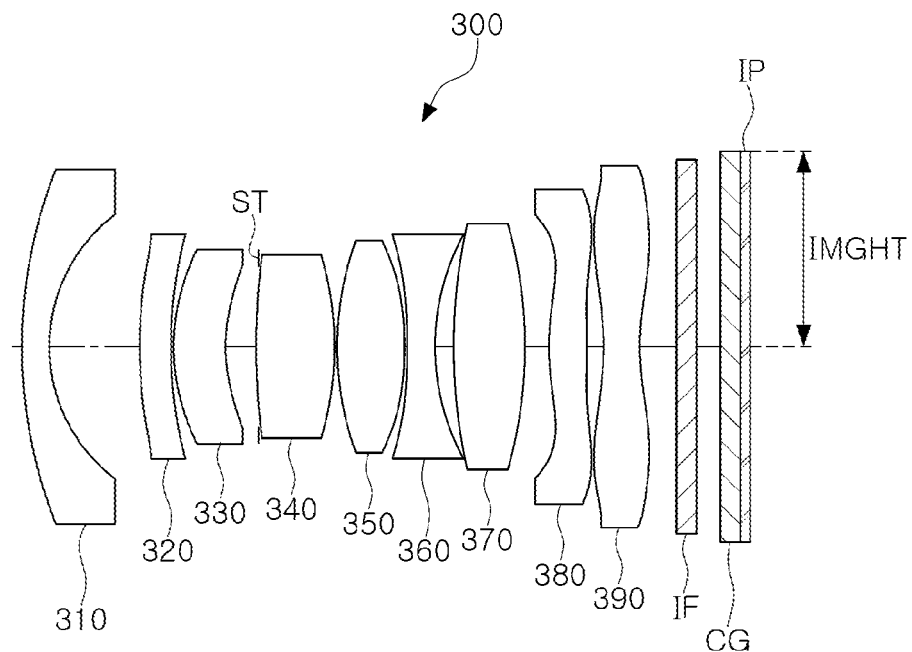
FIG. 9 is a view illustrating an imaging lens system according to a third example.

Hereinafter, an imaging lens system 300 according to a third example will be described with reference to FIG. 9.

The imaging lens system 300 may include a first lens 310, a second lens 320, a third lens 330, a fourth lens 340, a fifth lens 350, a sixth lens 360, a seventh lens 370, an eighth lens 380, and a ninth lens 390.

The first lens 310 may have negative refractive power, and may have a convex object-side surface and a concave image-side surface. The second lens 320 may have positive refractive power, and may have a convex object-side surface and a concave image-side surface. The third lens 330 may have negative refractive power, and may have a convex object-side surface and a concave image-side surface. The fourth lens 340 may have positive refractive power, and may have a convex object-side surface and a convex image-side surface. The fifth lens 350 may have a positive refractive power, and may have a convex object-side surface and a convex image-side surface. The sixth lens 360 may have negative refractive power, and may have a concave object-side surface and a concave image-side surface. The seventh lens 370 may have positive refractive power and may have a convex object-side surface and a convex image-side surface. The eighth lens 380 may have positive refractive power, and may have a convex object-side surface and a convex image-side surface. The ninth lens 390 may have negative refractive power and may have a concave object-side surface and a concave image-side surface.

The imaging lens system 300 may further include a filter IF, a cover glass CG, an image sensor IP, and a stop ST. The filter IF and the cover glass CG may be sequentially disposed between the ninth lens 390 and the image sensor IP. The stop ST may be disposed between the third lens 330 and the fourth lens 340.

Figure 10:
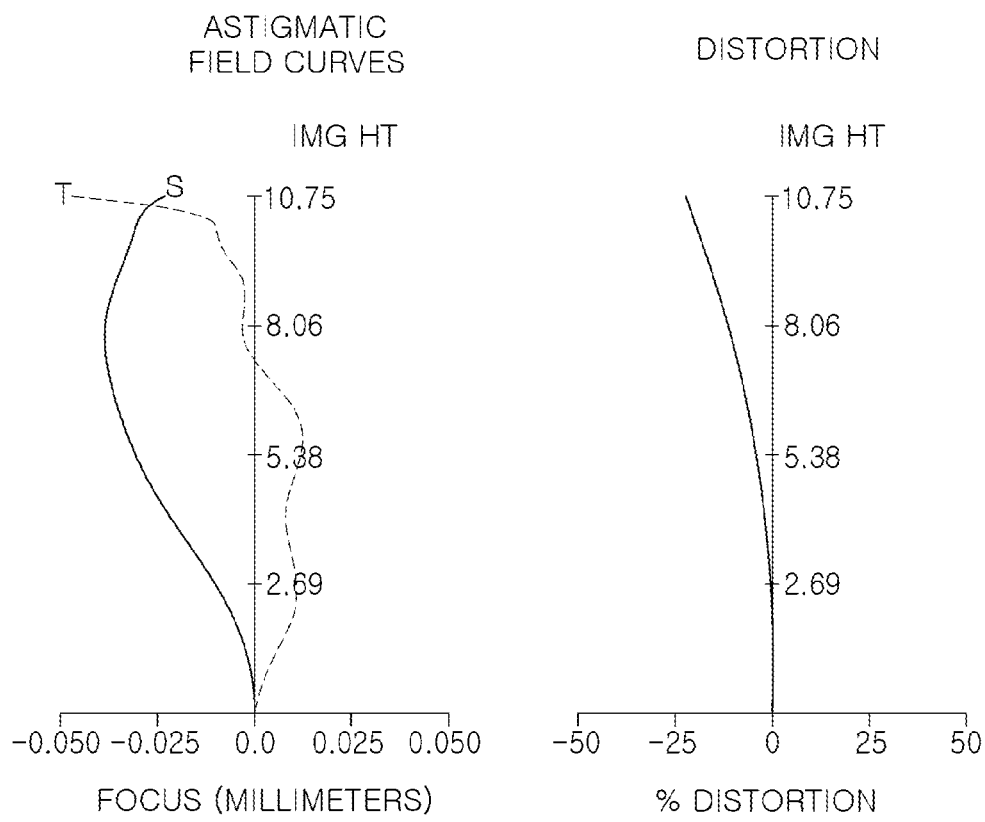
FIG. 10 is a view illustrating aberration curves of the imaging lens system illustrated in FIG. 9.
Figure 11:
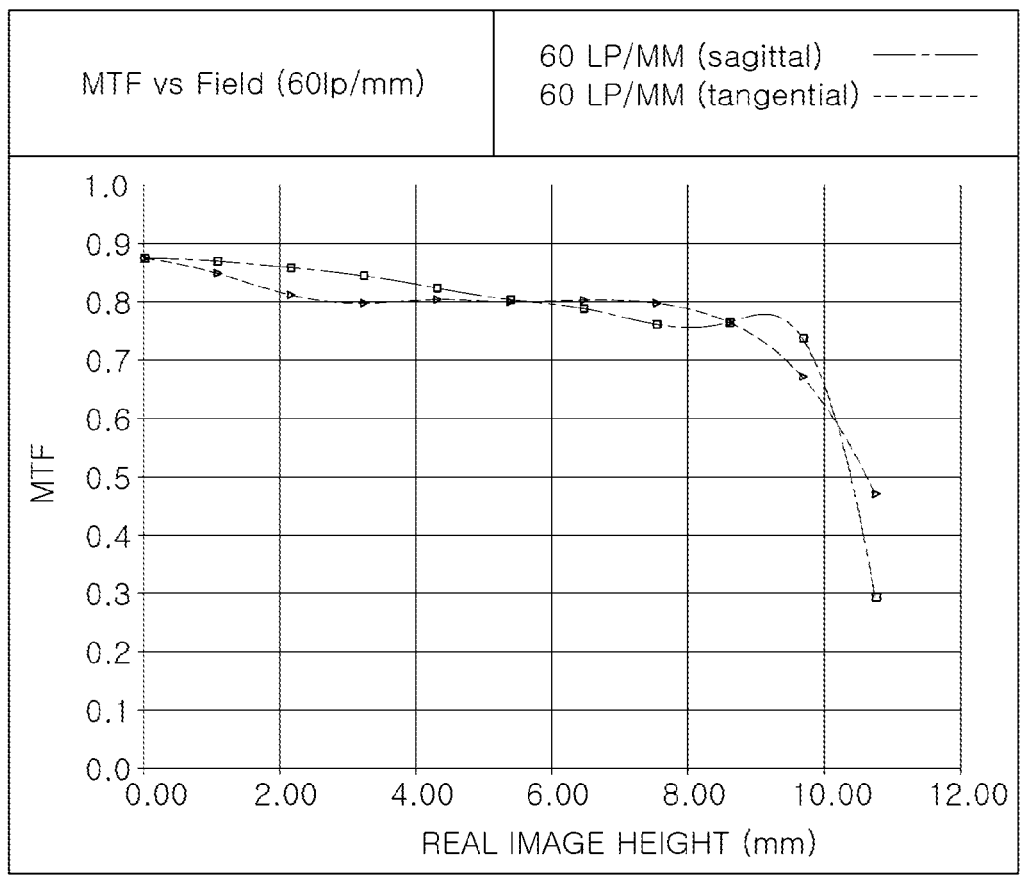
FIG. 11 is a graph illustrating MTF curves of the imaging lens system illustrated in FIG. 9.
Figure 12:
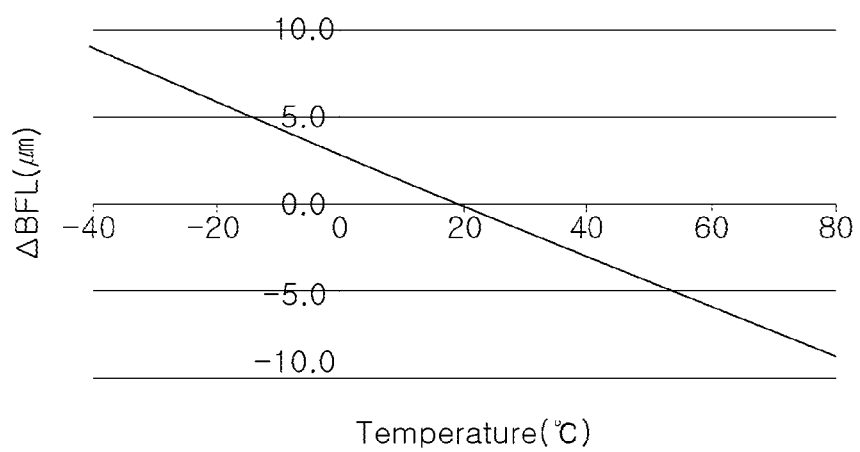
FIG. 12 is a graph illustrating a curve of a BFL depending on a change in temperature of the imaging lens system illustrated in FIG. 9.

FIGS. 10 and 11 illustrate aberration characteristics and MTF characteristics of the imaging lens system 300 according to the third example. FIG. 12 illustrates a change in back focal length ΔBFL (μm) of the imaging lens system 300 depending on temperature.

Lens characteristics and aspheric values of the imaging lens system 300 according to the third example are listed in Tables 5 and 6. In the third example, a temperature compensation lens is a fourth lens having a DTn value of 4.40.

TABLE 5

| Surface No. | Note | Radius of Curvature | Thickness/ Distance | Refractive Index | Abbe Number | DTn (10⁻⁶/° C.) | CTE (10⁻⁶/° C.) | VT (10³) |
|---|---|---|---|---|---|---|---|---|
| S1 | First Lens | 26.502 | 1.500 | 1.5168 | 64.17 | 1.60 | 8.00 | −206 |
| S2 | | 9.127 | 4.976 | | | | | |
| S3 | Second Lens | 38.566 | 1.705 | 1.5365 | 55.88 | −93.30 | 60.00 | −4.00 |
| S4 | | 62.696 | 0.150 | | | | | |
| S5 | Third Lens | 11.589 | 2.851 | 1.5365 | 55.88 | −93.30 | 60.00 | −4.00 |
| S6 | | 8.830 | 1.809 | | | | | |
| S7 | Stop | Infinity | −0.127 | | | | | |
| S8 | Fourth Lens | 31.688 | 4.322 | 1.7680 | 49.24 | 4.40 | 5.90 | −5850 |
| S9 | | −18.192 | 0.150 | | | | | |
| S10 | Fifth Lens | 15.079 | 3.700 | 1.5365 | 55.88 | −93.30 | 60.00 | −4.00 |
| S11 | | −18.654 | 0.150 | | | | | |
| S12 | Sixth Lens | −33.137 | 1.520 | 1.6397 | 23.53 | −115.00 | 66.00 | −4.00 |
| S13 | | 10.919 | 1.029 | | | | | |
| S14 | Seventh Lens | 23.266 | 3.908 | 1.5365 | 55.88 | −93.30 | 60.00 | −4.00 |
| S15 | | −50.000 | 1.316 | | | | | |
| S16 | Eighth Lens | 12.549 | 2.100 | 1.5365 | 55.88 | −93.30 | 60.00 | −4.00 |
| S17 | | −43.295 | 0.910 | | | | | |
| S18 | Ninth Lens | −14.533 | 2.000 | 1.5365 | 55.88 | −93.30 | 60.00 | −4.00 |
| S19 | | 12.953 | 2.000 | | | | | |
| S20 | Filter | Infinity | 1.100 | 1.5168 | 64.17 | 1.60 | 8.00 | −206 |
| S21 | | Infinity | 1.322 | | | | | |
| S22 | Cover Glass | Infinity | 1.100 | 1.5168 | 64.17 | 1.60 | 8.00 | −206 |
| S23 | | Infinity | 0.013 | | | | | |
| S24 | Imaging Plane | Infinity | Infinity | | | | | |

TABLE 6

| Surface No. | K | A | B | C | D | E | F |
|---|---|---|---|---|---|---|---|
| S3 | 0 | 4.7222E−04 | −4.4010E−06 | −2.8628E−07 | 3.7572E−09 | — | — |
| S4 | 0 | 1.2670E−03 | −1.3890E−05 | −7.1737E−07 | 1.4234E−08 | — | — |
| S5 | 0 | 7.1064E−05 | 9.7142E−07 | −5.2555E−07 | 1.3594E−08 | — | — |
| S6 | 0 | −1.1098E−03 | 3.1461E−05 | −1.1503E−06 | 2.9209E−08 | — | — |
| S8 | 0 | −1.2390E−04 | 2.3157E−06 | −3.3924E−07 | 9.5205E−09 | — | — |
| S9 | 0 | 9.6096E−05 | −8.7548E−06 | 1.7625E−07 | −1.0549E−09 | — | — |
| S10 | 0 | 1.4640E−05 | −9.7359E−06 | 1.3783E−07 | 9.0921E−10 | — | — |
| S11 | 0 | −2.4023E−04 | −6.6851E−06 | 1.2929E−07 | 1.5543E−09 | — | — |
| S12 | 0 | −1.2500E−04 | −4.3740E−06 | 2.8848E−08 | 1.6346E−09 | — | — |
| S13 | 0 | −4.0285E−04 | 1.7808E−05 | −4.7599E−07 | 3.2230E−09 | — | — |
| S14 | 0 | −5.3481E−04 | 2.0928E−05 | −1.7357E−07 | −4.0559E−10 | −3.0186E−11 | — |
| S15 | 0 | −1.5987E−03 | 6.0673E−05 | −1.2039E−06 | 1.6860E−08 | −1.1435E−10 | — |
| S16 | 0 | −1.3344E−03 | 1.4721E−05 | −2.9644E−07 | 1.1355E−09 | 1.3727E−11 | — |
| S17 | 0 | 1.6494E−03 | −5.3255E−05 | 7.8367E−07 | −6.0960E−09 | 1.9613E−11 | — |
| S18 | 0 | 1.0345E−03 | −2.6754E−05 | 6.7709E−07 | −1.0078E−08 | 7.8768E−11 | −2.5687E−13 |
| S19 | 0 | −1.0504E−03 | 1.4659E−05 | −2.4687E−07 | 3.0639E−09 | −1.8159E−11 | 3.1843E−14 |

Figure 13:
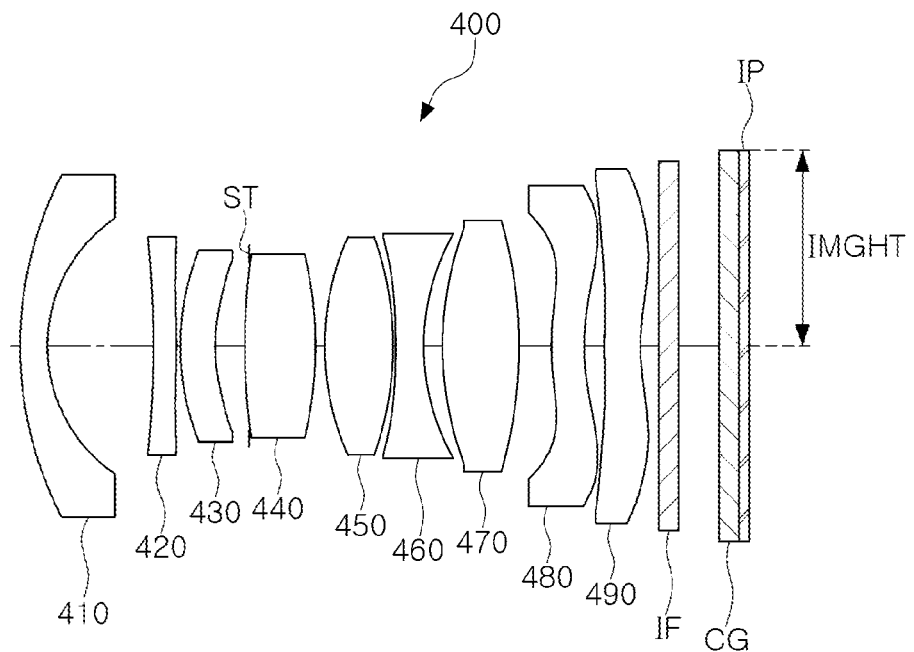
FIG. 13 is a view illustrating an imaging lens system according to a fourth example.

Hereinafter, an imaging lens system 400 according to a fourth example will be described with reference to FIG. 13.

The imaging lens system 400 may include a first lens 410, a second lens 420, a third lens 430, a fourth lens 440, a fifth lens 450, a sixth lens 460, a seventh lens 470, an eighth lens 480, and a ninth lens 490.

The first lens 410 may have negative refractive power, and may have a convex object-side surface and a concave image-side surface. The second lens 420 may have positive refractive power, and may have a concave object-side surface and a convex image-side surface. The third lens 430 may have negative refractive power, and may have a convex object-side surface and a concave image-side surface. The fourth lens 440 may have positive refractive power, and may have a convex object-side surface and a convex image-side surface. The fifth lens 450 may have positive refractive power, and may have a convex object-side surface and a convex image-side surface. The sixth lens 460 may have negative refractive power, and may have a concave object-side surface and a concave image-side surface. The seventh lens 470 may have positive refractive power, and may have a convex object-side surface and a convex image-side surface. The eighth lens 480 may have positive refractive power, and may have a convex object-side surface and a concave image-side surface. The ninth lens 490 may have negative refractive power, and may have a convex object-side surface and a concave image-side surface.

The imaging lens system 400 may further include a filter IF, a cover glass CG, an image sensor IP, and a stop ST. The filter IF and the cover glass CG may be sequentially disposed between the ninth lens 490 and the image sensor IP. The stop ST may be disposed between the third lens 430 and the fourth lens 440.

Figure 14:
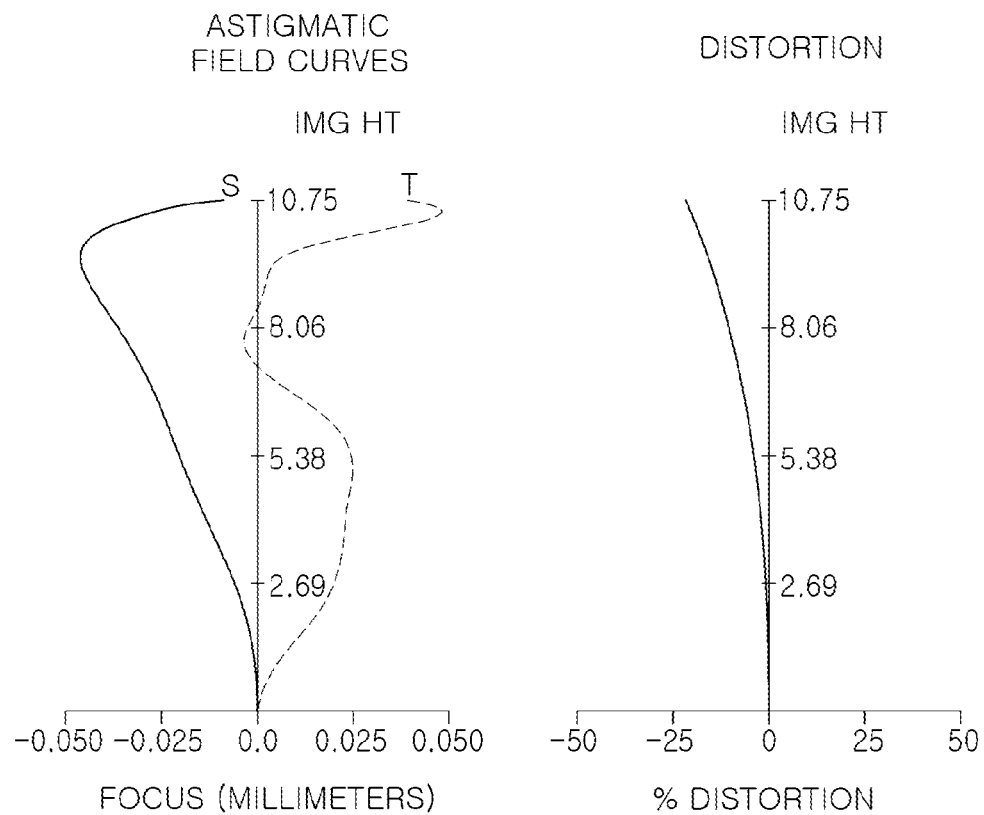
FIG. 14 is a view illustrating aberration curves of the imaging lens system illustrated in FIG. 13.
Figure 15:
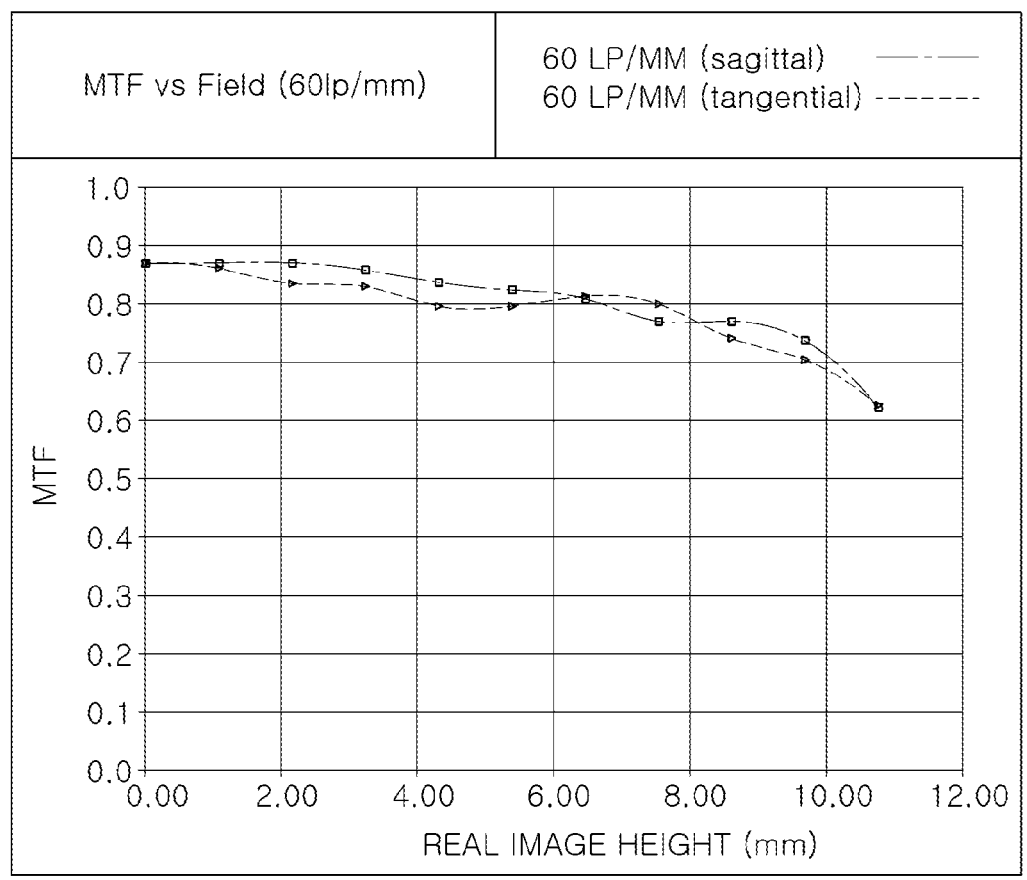
FIG. 15 is a graph illustrating MTF curves of the imaging lens system illustrated in FIG. 13.
Figure 16:
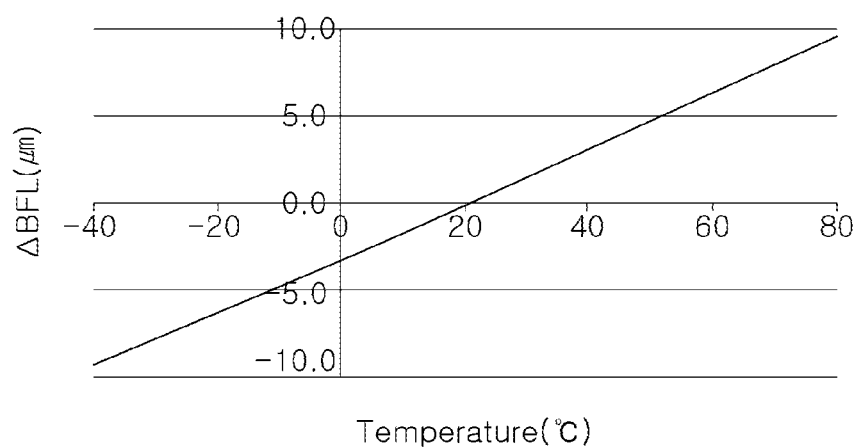
FIG. 16 is a graph illustrating a curve of a BFL depending on a change in temperature of the imaging lens system illustrated in FIG. 13.

FIGS. 14 and 15 illustrate aberration characteristics and MTF characteristics of the imaging lens system 400 according to the fourth example. FIG. 16 illustrates a change in back focal length ΔBFL (μm) of the imaging lens system 400 depending on temperature.

Lens characteristics and aspheric values of the imaging lens system 400 according to the fourth example are listed in Tables 7 and 8. In the fourth example, a temperature compensation lens is a fourth lens having a DTn value of 4.50.

TABLE 7

| Surface No. | Note | Radius of Curvature | Thickness/Distance | Refractive Index | Abbe Number | DTn ($10^{-6}$/° C.) | CTE ($10^{-6}$/° C.) | VT ($10^3$) |
|---|---|---|---|---|---|---|---|---|
| S1 | First Lens | 20.515 | 1.500 | 1.5286 | 76.97 | −8.10 | 8.00 | −43.0 |
| S2 |  | 8.508 | 5.807 |  |  |  |  |  |
| S3 | Second Lens | −59.411 | 1.281 | 1.5365 | 55.88 | −93.30 | 60.00 | −4.00 |
| S4 |  | −33.037 | 0.200 |  |  |  |  |  |
| S5 | Third Lens | 12.857 | 1.917 | 1.5365 | 55.88 | −93.30 | 60.00 | −4.00 |
| S6 |  | 8.885 | 1.881 |  |  |  |  |  |
| S7 | Stop | Infinity | −0.255 |  |  |  |  |  |
| S8 | Fourth lens | 32.370 | 3.906 | 1.7725 | 49.50 | 4.50 | 8.00 | −447 |
| S9 |  | −21.404 | 0.500 |  |  |  |  |  |
| S10 | Fifth Lens | 13.581 | 3.750 | 1.5365 | 55.88 | −93.30 | 60.00 | −4.00 |
| S11 |  | −26.411 | 0.150 |  |  |  |  |  |
| S12 | Sixth Lens | −38.821 | 1.533 | 1.6397 | 23.53 | −115.00 | 66.00 | −4.00 |
| S13 |  | 10.937 | 1.029 |  |  |  |  |  |
| S14 | Seventh lens | 16.493 | 4.200 | 1.5365 | 55.88 | −93.30 | 60.00 | −4.00 |
| S15 |  | −22.301 | 1.771 |  |  |  |  |  |
| S16 | Eighth Lens | 13.219 | 1.800 | 1.5365 | 55.88 | −93.30 | 60.00 | −4.00 |
| S17 |  | 12.730 | 1.109 |  |  |  |  |  |
| S18 | Ninth Lens | 52.762 | 2.000 | 1.5365 | 55.88 | −93.30 | 60.00 | −4.00 |
| S19 |  | 11.433 | 1.000 |  |  |  |  |  |
| S20 | Filter | Infinity | 1.100 | 1.5168 | 64.17 | 1.60 | 8.00 | −206 |
| S21 |  | Infinity | 2.213 |  |  |  |  |  |
| S22 | Cover Glass | Infinity | 1.100 | 1.5168 | 64.17 | 1.60 | 8.00 | −206 |
| S23 |  | Infinity | 0.017 |  |  |  |  |  |
| S24 | Imaging Plane | Infinity |  |  |  |  |  |  |

TABLE 8

| Surface No. | K | A | B | C | D | E | F |
|---|---|---|---|---|---|---|---|
| S3 | 0 | 4.9321E−04 | −1.5961E−05 | −8.0062E−09 | 2.1774E−09 | — | — |
| S4 | 0 | 1.0640E−03 | −2.1909E−05 | −5.9067E−08 | 4.4272E−09 | — | — |
| S5 | 0 | −6.3621E−04 | 2.6559E−05 | −5.5006E−07 | 8.7074E−09 | — | — |
| S6 | 0 | −1.6198E−03 | 4.7034E−05 | −9.6408E−07 | 1.7997E−08 | — | — |
| S8 | 0 | 1.0623E−05 | −7.4896E−06 | 2.2917E−07 | −1.5116E−09 | — | — |
| S9 | 0 | 6.4693E−05 | −6.0843E−06 | 2.3106E−07 | −3.5552E−09 | — | — |
| S10 | 0 | −1.1175E−04 | −3.8051E−06 | 2.1238E−07 | −2.5931E−09 | — | — |
| S11 | 0 | −1.8786E−04 | −2.0288E−05 | 7.8863E−07 | −8.0348E−09 | — | — |
| S12 | 0 | −5.4213E−05 | −1.6359E−05 | 5.4112E−07 | −4.9037E−09 | — | — |
| S13 | 0 | −3.2284E−04 | 8.8836E−06 | −2.3310E−07 | 2.2812E−09 | — | — |
| S14 | 0 | −2.6587E−04 | 7.8980E−06 | −1.2490E−07 | 2.6830E−09 | −4.1934E−11 | — |
| S15 | 0 | −5.5898E−04 | 2.6826E−05 | −7.3072E−07 | 1.4964E−08 | −1.2145E−10 | — |
| S16 | 0 | −1.3371E−03 | 4.1179E−06 | −2.0940E−07 | 5.1191E−09 | −3.3205E−11 | — |
| S17 | 0 | −3.8694E−04 | −1.4674E−05 | 4.0990E−07 | −5.1913E−09 | 2.4471E−11 | — |
| S18 | 0 | −1.0968E−03 | 3.4071E−05 | −5.6814E−07 | 5.7289E−09 | −3.6710E−11 | 1.1829E−13 |
| S19 | 0 | −1.7607E−03 | 3.7552E−05 | −7.6496E−07 | 1.0336E−08 | −7.5071E−11 | 2.1462E−13 |

Figure 17:
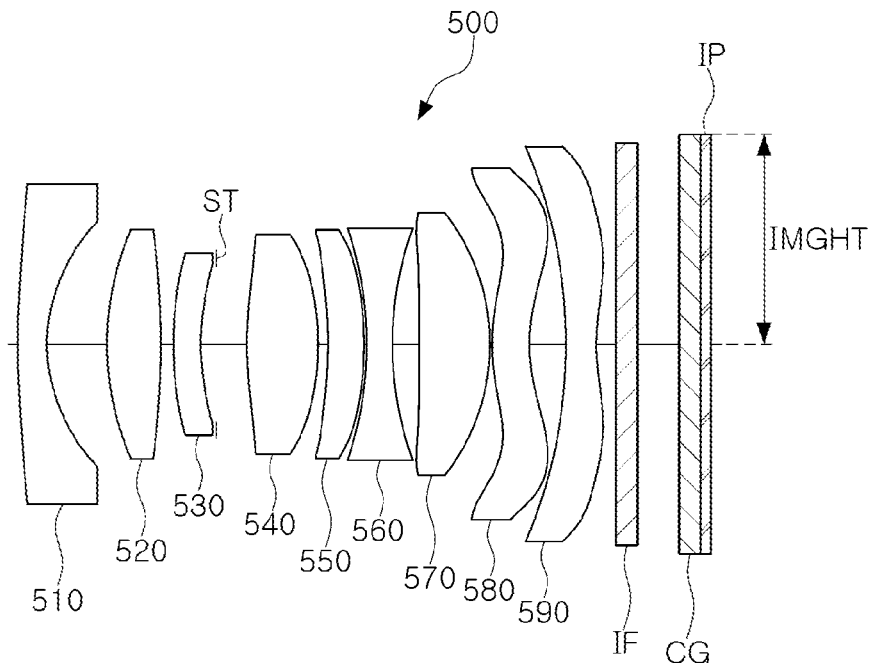
FIG. 17 is a view illustrating an imaging lens system according to a fifth example.

Hereinafter, an imaging lens system 500 according to a fifth example will be described with reference to FIG. 17.

The imaging lens system 500 may include a first lens 510, a second lens 520, a third lens 530, a fourth lens 540, a fifth lens 550, a sixth lens 560, a seventh lens 570, an eighth lens 580, and a ninth lens 590.

The first lens 510 may have negative refractive power, and may have a convex object-side surface and a concave image-side surface. The second lens 520 may have positive refractive power, and may have a convex object-side surface and a convex image-side surface. The third lens 530 may have negative refractive power, and may have a convex object-side surface and a concave image-side surface. The fourth lens 540 may have positive refractive power, and may have a convex object-side surface and a convex image-side surface. The fifth lens 550 may have positive refractive power, and may have a concave object-side surface and a convex image-side surface. The sixth lens 560 may have negative refractive power, and may have a concave object-side surface and a concave image-side surface. The seventh lens 570 may have positive refractive power, and may have a concave object-side surface and a convex image-side surface. The eighth lens 580 may have positive refractive power, and may have a convex object-side surface and a concave image-side surface. The ninth lens 590 may have negative refractive power, and may have a convex object-side surface and a concave image-side surface.

The imaging lens system 500 may further include a filter IF, a cover glass CG, an image sensor IP, and a stop ST. The filter IF and the cover glass CG may be sequentially disposed between the ninth lens 590 and the image sensor IP. The stop ST may be disposed between the third lens 530 and the fourth lens 540.

Figure 18:
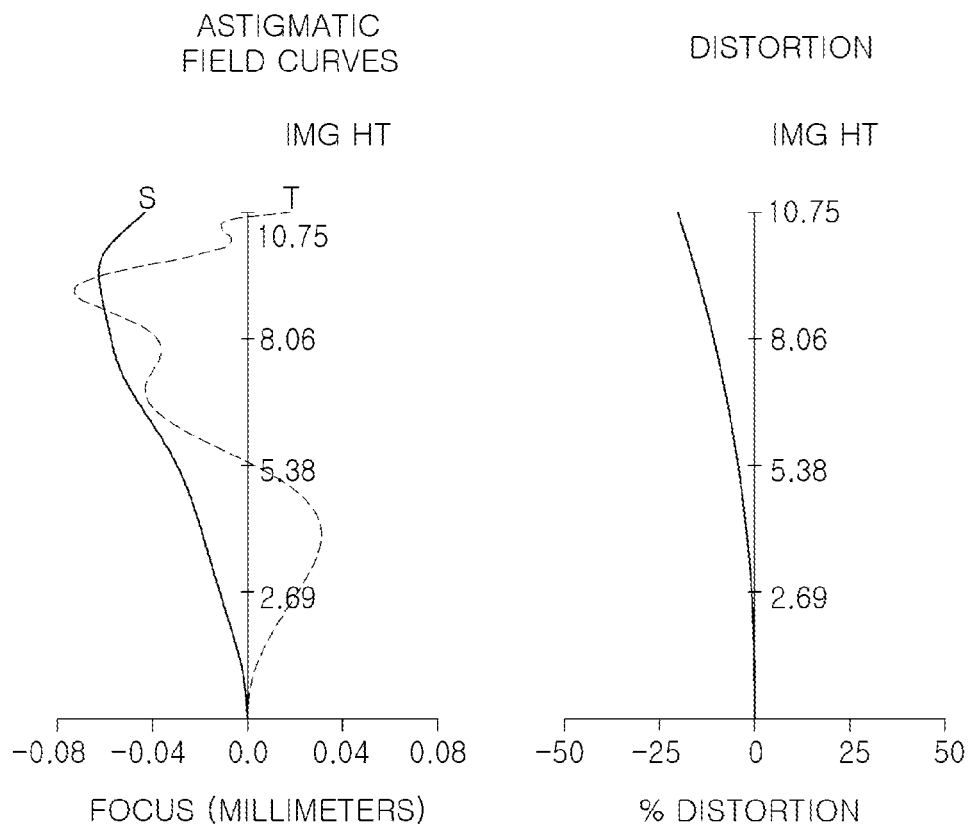
FIG. 18 is a view illustrating aberration curves of the imaging lens system illustrated in FIG. 17.
Figure 19:
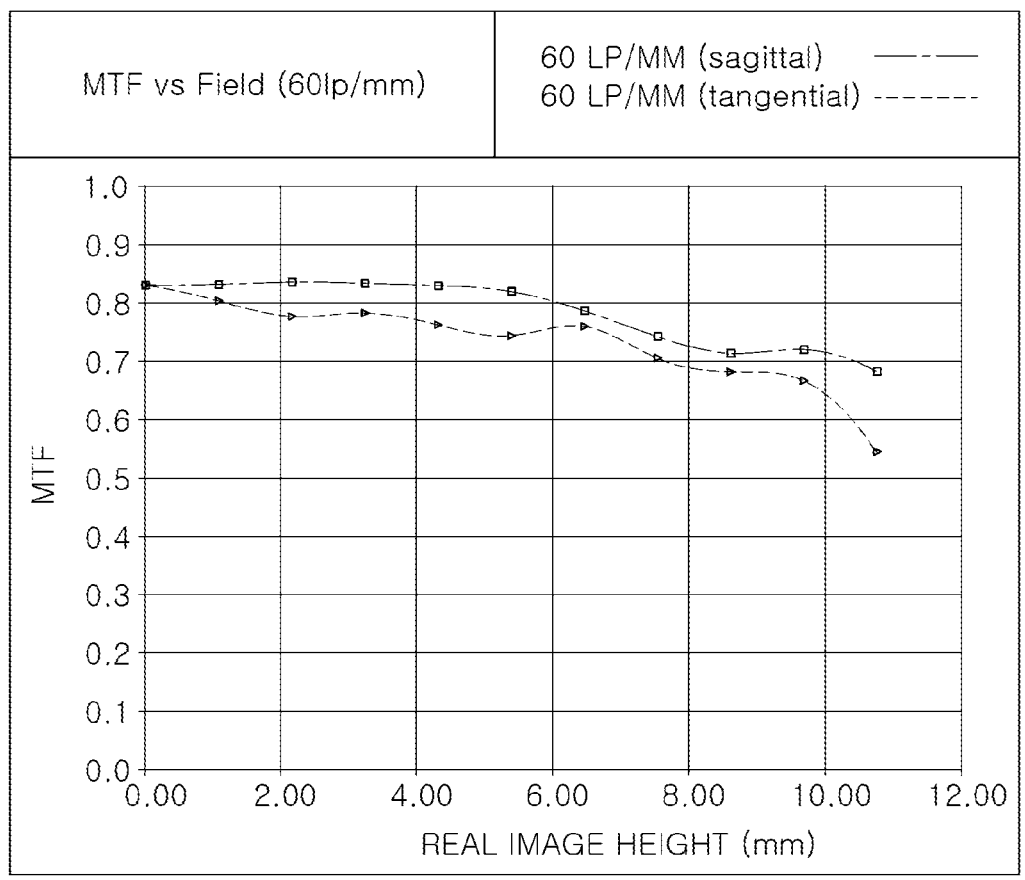
FIG. 19 is a graph illustrating MTF curves of the imaging lens system illustrated in FIG. 17.
Figure 20:
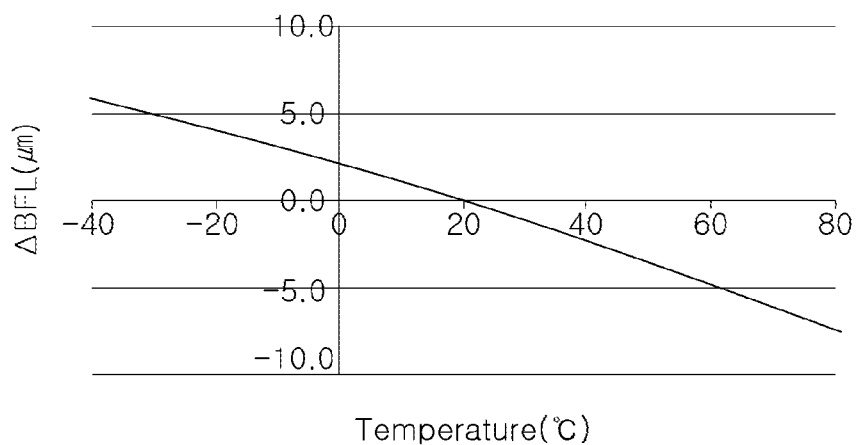
FIG. 20 is a graph illustrating a curve of a BFL depending on a change in temperature of the imaging lens system illustrated in FIG. 17.

FIGS. 18 and 19 illustrate aberration characteristics and MTF characteristics of the imaging lens system 500 according to the fifth example. FIG. 20 illustrates a change in back focal length ΔBFL (μm) of the imaging lens system 500 depending on temperature.

Lens characteristics and aspheric values of the imaging lens system 500 according to the fifth example are listed in Tables 9 and 10. In the fifth example, the temperature compensation lens is a fourth lens having a DTn value of 4.50.

TABLE 9

| Surface No. | Note | Radius of Curvature | Thickness/ Distance | Refractive Index | Abbe Number | DTn ($10^{-6}/°$ C.) | CTE ($10^{-6}/°$ C.) | VT ($10^3$) |
|---|---|---|---|---|---|---|---|---|
| S1 | First Lens | 34.039 | 1.500 | 1.5831 | 59.46 | 2.70 | 7.10 | −405 |
| S2 |  | 8.006 |  |  |  |  |  |  |
| S3 | Second Lens | 17.728 | 2.746 | 1.5365 | 55.88 | −93.30 | 60.00 | −4.00 |
| S4 |  | −19.004 | 0.648 |  |  |  |  |  |
| S5 | Third Lens | 19.902 | 1.391 | 1.5345 | 55.70 | −92.70 | 60.00 | −4.00 |
| S6 |  | 10.622 | 0.808 |  |  |  |  |  |
| S7 | Stop | Infinity | 1.568 |  |  |  |  |  |
| S8 | Fourth Lens | 19.323 | 3.656 | 1.7725 | 49.50 | 4.50 | 8.00 | −447 |
| S9 |  | −14.079 | 0.500 |  |  |  |  |  |
| S10 | Fifth Lens | −23.375 | 1.850 | 1.5345 | 55.70 | −92.70 | 60.00 | −4.00 |
| S11 |  | −16.991 | 0.138 |  |  |  |  |  |
| S12 | Sixth lens | −22.311 | 1.314 | 1.6612 | 20.35 | −115.00 | 66.00 | −4.00 |
| S13 |  | 18.042 | 1.361 |  |  |  |  |  |
| S14 | Seventh lens | −186.902 | 3.630 | 1.5365 | 55.88 | −93.3 | 60.0 | −4.00 |
| S15 |  | −8.786 | 0.100 |  |  |  |  |  |
| S16 | Eighth Lens | 10.461 | 1.920 | 1.5365 | 55.88 | −93.3 | 60.0 | −4.00 |
| S17 |  | 8.922 | 1.885 |  |  |  |  |  |
| S18 | Ninth Lens | 79.879 | 1.557 | 1.5365 | 55.88 | −93.3 | 60.0 | −4.00 |
| S19 |  | 10.429 | 1.000 |  |  |  |  |  |
| S20 | Filter | Infinity | 1.100 | 1.5168 | 64.17 | 1.6 | 8.00 | −206 |
| S21 |  | Infinity | 2.133 |  |  |  |  |  |
| S22 | Cover Glass | Infinity | 1.100 | 1.5168 | 64.17 | 1.6 | 8.00 | −206 |
| S23 |  | Infinity | 0.016 |  |  |  |  |  |
| S24 | Imaging Plane | Infinity |  |  |  |  |  |  |

TABLE 10

| Surface No. | K | A | B | C | D | E | F | G |
|---|---|---|---|---|---|---|---|---|
| S1 | 0 | −3.3733E−04 | 6.2154E−06 | −5.1552E−08 | 1.3672E−10 | — | — | — |
| S2 | 0 | −3.7441E−04 | 2.7751E−06 | −5.3611E−08 | 1.1251E−09 | — | — | — |
| S3 | −2.280E+01 | 9.0088E−04 | −1.3179E−05 | −1.2404E−08 | 3.6802E−10 | — | — | — |
| S4 | −1.468E+01 | 1.1967E−03 | −3.1619E−05 | 3.2036E−08 | 3.1352E−09 | — | — | — |
| S5 | 0 | −2.4970E−05 | 1.9201E−05 | −1.2277E−06 | 2.6689E−08 | — | — | — |
| S6 | 0 | −1.7666E−03 | 9.5811E−05 | −3.1607E−06 | 6.8706E−08 | — | — | — |
| S8 | −7.721E−01 | −4.6545E−04 | 5.1366E−06 | −4.2208E−07 | 1.1264E−08 | — | — | — |

TABLE 10-continued

| Surface No. | K | A | B | C | D | E | F | G |
|---|---|---|---|---|---|---|---|---|
| S9 | 0 | −1.8594E−04 | 4.2876E−06 | −4.1312E−07 | 7.0740E−09 | — | — | — |
| S10 | −1.756E−02 | 8.9550E−05 | 1.2095E−05 | −3.5731E−07 | −5.4759E−10 | — | — | — |
| S11 | 2.358E−02 | 2.0308E−04 | −9.6798E−06 | −2.6901E−07 | 5.6430E−09 | — | — | — |
| S12 | 3.962E+00 | −3.2956E−04 | 2.3754E−05 | −1.4063E−06 | 3.6734E−08 | −2.92E−10 | — | — |
| S13 | 4.535E+00 | −5.2212E−04 | 1.2977E−05 | −5.3256E−08 | 1.1651E−09 | −3.44E−11 | — | — |
| S14 | 0 | 4.8537E−04 | −3.9624E−05 | 7.6890E−07 | 5.6796E−10 | −6.61E−11 | — | — |
| S15 | 0 | 6.4924E−04 | −3.6635E−05 | 1.1617E−06 | −1.9395E−08 | 1.98E−10 | — | — |
| S16 | 0 | −7.2962E−04 | −3.0321E−05 | 6.1289E−07 | −4.1737E−09 | 1.03E−11 | — | — |
| S17 | −8.518E+00 | 6.3056E−04 | −5.4543E−05 | 1.2370E−06 | −1.4448E−08 | 6.62E−11 | — | — |
| S18 | 0 | −1.6400E−03 | 3.7900E−05 | −6.8800E−07 | 1.8100E−08 | −3.62E−10 | 3.42E−12 | −1.16E−14 |
| S19 | 0 | −2.4400E−03 | 5.9300E−05 | −1.5400E−06 | 3.1900E−08 | −4.03E−10 | 2.64E−12 | −7.01E−15 |

Figure 21:
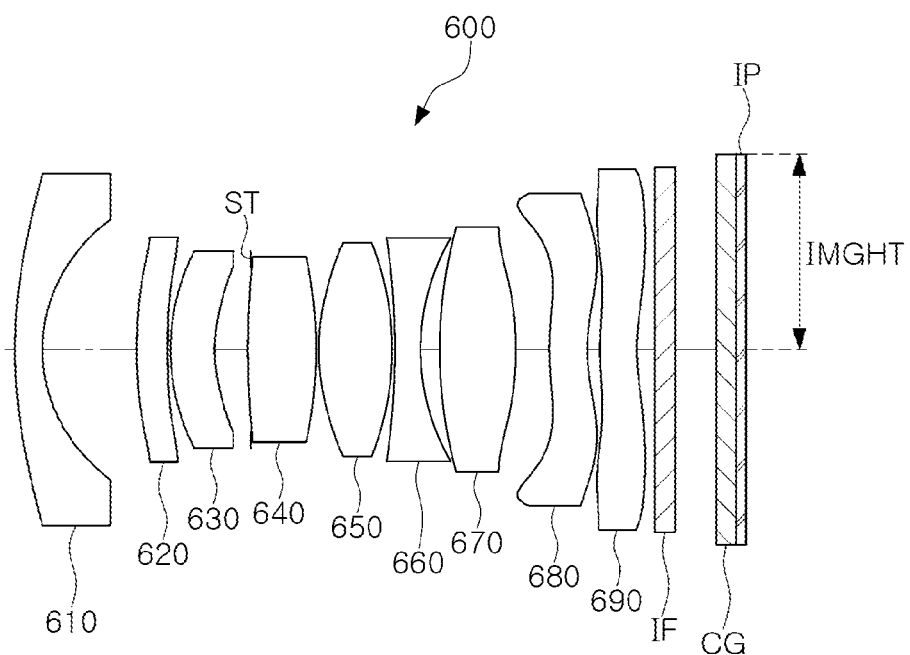
FIG. 21 is a view illustrating an imaging lens system according to a sixth example.

Hereinafter, an imaging lens system 600 according to a sixth example will be described with reference to FIG. 21.

The imaging lens system 600 may include a first lens 610, a second lens 620, a third lens 630, a fourth lens 640, a fifth lens 650, a sixth lens 660, a seventh lens 670, an eighth lens 680, and a ninth lens 690.

The first lens 610 may have negative refractive power, and may have a convex object-side surface and a concave image-side surface. The second lens 620 may have positive refractive power, and may have a convex object-side surface and a concave image-side surface. The third lens 630 may have negative refractive power, and may have a convex object-side surface and a concave image-side surface. The fourth lens 640 may have positive refractive power, and may have a convex object-side surface and a convex image-side surface. The fifth lens 650 may have positive refractive power, and may have a convex object-side surface and a convex image-side surface. The sixth lens 660 may have negative refractive power, and may have a concave object-side surface and a concave image-side surface. The seventh lens 670 may have positive refractive power, and may have a convex object-side surface and a convex image-side surface. The eighth lens 680 may have negative refractive power, and may have a convex object-side surface and a concave image-side surface. The ninth lens 690 may have negative refractive power and may have a convex object-side surface and a concave image-side surface.

The imaging lens system 600 may further include a filter IF, a cover glass CG, an image sensor IP, and a stop ST. The filter IF and the cover glass CG may be sequentially disposed between the ninth lens 690 and the image sensor IP. The stop ST may be disposed between the third lens 630 and the fourth lens 640.

Figure 22:
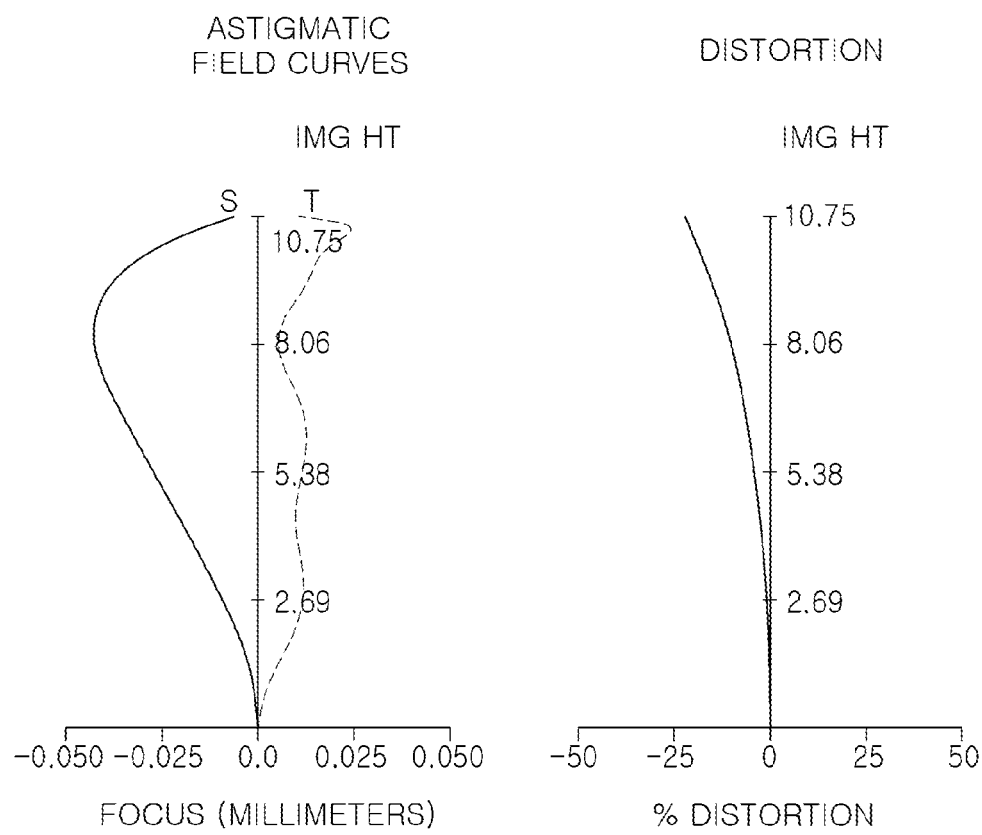
FIG. 22 is a view illustrating aberration curves of the imaging lens system illustrated in FIG. 21.
Figure 23:
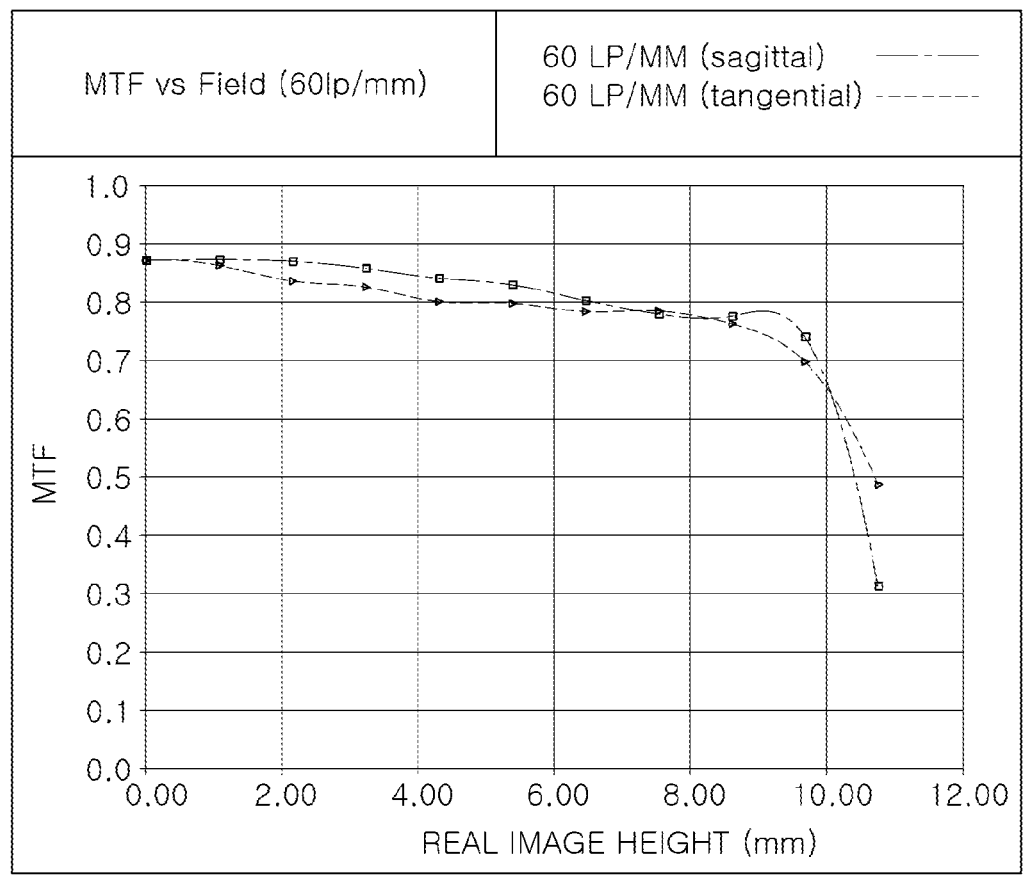
FIG. 23 is a graph illustrating MTF curves of the imaging lens system illustrated in FIG. 21.
Figure 24:
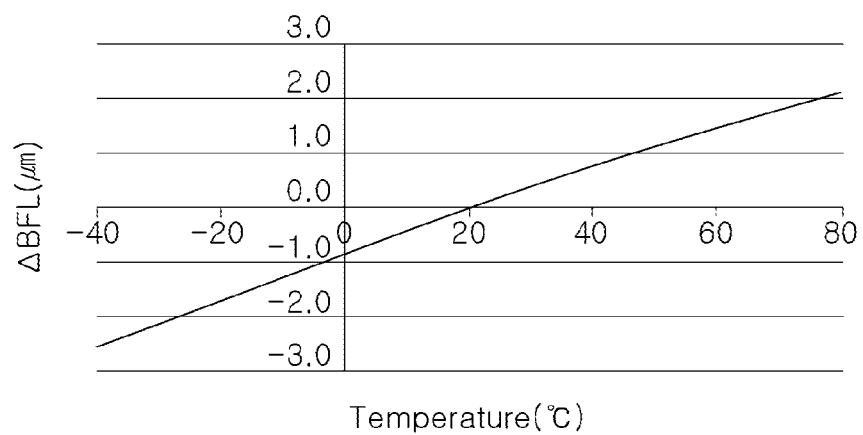
FIG. 24 is a graph illustrating a curve of a BFL depending on a change in temperature of the imaging lens system illustrated in FIG. 21.

FIGS. 22 and 23 illustrate aberration characteristics and MTF characteristics of the imaging lens system 600 according to the sixth example. FIG. 24 illustrates a change in back focal length ΔBFL (μm) of the imaging lens system 600 depending on temperature.

Lens characteristics and aspherical values of the imaging lens system 600 according to the sixth example are listed in Tables 11 and 12. In the sixth example, a temperature compensation lens is a fourth lens having a DTn value of 4.40.

TABLE 11

| Surface No. | Note | Radius of Curvature | Thickness/ Distance | Refractive Index | Abbe Number | DTn (10⁻⁶/° C.) | CTE (10⁻⁶/° C.) | VT (10³) |
|---|---|---|---|---|---|---|---|---|
| S1 | First Lens | 27.921 | 1.500 | 1.5365 | 55.91 | −93.30 | 60.00 | −4.00 |
| S2 | | 8.514 | 5.166 | | | | | |
| S3 | Second Lens | 38.773 | 1.686 | 1.5365 | 55.91 | −93.30 | 60.00 | −4.00 |
| S4 | | 128.875 | 0.150 | | | | | |
| S5 | Third Lens | 10.127 | 2.427 | 1.6397 | 23.53 | −115.0 | 66.00 | −4.00 |
| S6 | | 8.403 | 1.967 | | | | | |
| S7 | Stop | Infinity | −0.154 | | | | | |
| S8 | Fourth Lens | 50.236 | 3.753 | 1.7680 | 49.24 | 4.40 | 5.90 | −5850 |
| S9 | | −23.416 | 0.150 | | | | | |
| S10 | Fifth Lens | 11.95 | 4.000 | 1.5365 | 55.91 | −93.30 | 60.00 | −4.00 |
| S11 | | −20.351 | 0.150 | | | | | |
| S12 | Sixth Lens | −120.354 | 1.408 | 1.6397 | 23.53 | −115.0 | 66.00 | −4.00 |
| S13 | | 10.138 | 1.049 | | | | | |
| S14 | Seventh Lens | 25.842 | 4.167 | 1.5365 | 55.91 | −93.30 | 60.00 | −4.00 |
| S15 | | −19.456 | 1.823 | | | | | |
| S16 | Eighth Lens | 14.769 | 2.100 | 1.5365 | 55.91 | −93.30 | 60.00 | −4.00 |
| S17 | | 9.317 | 0.704 | | | | | |
| S18 | Ninth Lens | 17.281 | 2.000 | 1.5365 | 55.91 | −93.30 | 60.00 | −4.00 |
| S19 | | 11.091 | 1.000 | | | | | |
| S20 | Filter | Infinity | 1.100 | 1.5168 | 64.17 | 1.60 | 8.00 | −206.00 |
| S21 | | Infinity | 2.244 | | | | | |

TABLE 11-continued

| Surface No. | Note | Radius of Curvature | Thickness/ Distance | Refractive Index | Abbe Number | DTn ($10^{-6}$/° C.) | CTE ($10^{-6}$/° C.) | VT ($10^3$) |
|---|---|---|---|---|---|---|---|---|
| S22 | Cover Glass | Infinity | 1.100 | 1.5168 | 64.17 | 1.60 | 8.00 | −206.0 |
| S23 | | Infinity | 0.008 | | | | | |
| S24 | Imaging Plane | Infinity | | | | | | |

TABLE 12

| Surface No. | K | A | B | C | D | E | F |
|---|---|---|---|---|---|---|---|
| S1 | 0 | −3.3800E−07 | −4.2400E−07 | 8.2000E−10 | 8.7700E−12 | — | — |
| S2 | 0 | 9.5800E−06 | −5.6700E−07 | −1.4400E−08 | −4.9300E−11 | — | — |
| S3 | 0 | 6.7100E−04 | −1.5300E−05 | 4.3500E−08 | −1.1000E−10 | — | — |
| S4 | 0 | 1.1700E−03 | −3.0600E−05 | 1.6400E−07 | 5.6300E−10 | — | — |
| S5 | 0 | −4.0600E−04 | 1.9700E−06 | −5.5900E−08 | 3.2000E−09 | — | — |
| S6 | 0 | −1.3000E−03 | 3.4800E−05 | −8.7400E−07 | 1.8100E−08 | — | — |
| S8 | 0 | 2.4800E−05 | −1.7700E−06 | 6.1600E−09 | 9.7300E−10 | — | — |
| S9 | 0 | 7.1300E−05 | −3.8700E−06 | 1.6700E−07 | −3.5700E−09 | — | — |
| S10 | 0 | −1.9300E−04 | −4.5900E−06 | 1.6200E−07 | −4.0100E−10 | — | — |
| S11 | 0 | −5.8400E−04 | 1.4600E−05 | −1.5500E−07 | 1.4400E−09 | — | — |
| S12 | 0 | −6.4200E−04 | 2.4600E−05 | −4.5400E−07 | 1.3800E−09 | — | — |
| S13 | 0 | −5.4800E−04 | 2.0100E−05 | −3.4200E−07 | −3.0600E−10 | — | — |
| S14 | 0 | −1.9700E−04 | 5.0700E−06 | 2.7800E−07 | −3.7500E−09 | −5.08E−11 | — |
| S15 | 0 | −5.0700E−04 | 2.5100E−05 | −5.6000E−07 | 1.1600E−08 | −1.05E−10 | — |
| S16 | 0 | −1.7700E−03 | 1.8300E−05 | −1.7200E−08 | −6.4600E−09 | 8.10E−11 | — |
| S17 | 0 | −1.8500E−03 | 1.6000E−05 | −8.8200E−08 | 4.1000E−10 | −4.58E−12 | — |
| S18 | 0 | −2.0200E−03 | 4.3500E−05 | −4.0400E−07 | 1.4300E−09 | 8.55E−13 | −1.31E−14 |
| S19 | 0 | −2.0500E−03 | 4.8900E−05 | −7.6500E−07 | 6.9000E−09 | −3.28E−11 | 5.49E−14 |

Figure 25:
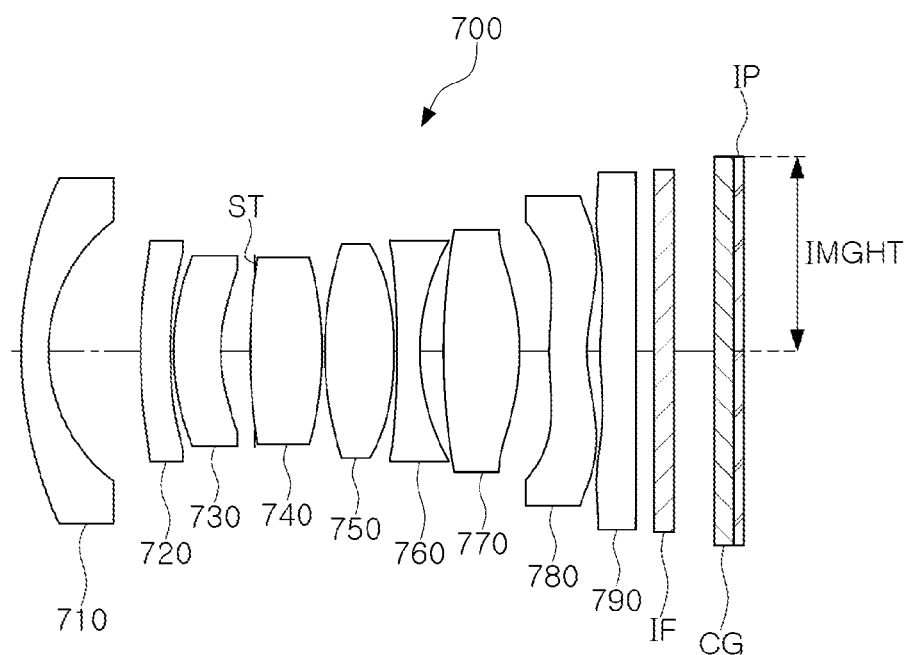
FIG. 25 is a view illustrating an imaging lens system according to a seventh example.

Hereinafter, an imaging lens system 700 according to a seventh example will be described with reference to FIG. 25.

The imaging lens system 700 may include a first lens 710, a second lens 720, a third lens 730, a fourth lens 740, a fifth lens 750, a sixth lens 760, a seventh lens 770, an eighth lens 780, and a ninth lens 790.

The first lens 710 may have negative refractive power, and may have a convex object-side surface and a concave image-side surface. The second lens 720 may have negative refractive power and may have a convex object-side surface and a concave image-side surface. The third lens 730 may have negative refractive power, and may have a convex object-side surface and a concave image-side surface. The fourth lens 740 may have positive refractive power and may have a convex object-side surface and a convex image-side surface. The fifth lens 750 may have positive refractive power, and may have a convex object-side surface and a convex image-side surface. The sixth lens 760 may have negative refractive power, and may have a concave object-side surface and a concave image-side surface. The seventh lens 770 may have a positive refractive power, and may have a convex object-side surface and a convex image-side surface. The eighth lens 780 may have negative refractive power, and may have a convex object-side surface and a concave image-side surface. The ninth lens 790 may have negative refractive power, and may have a convex object-side surface and a concave image-side surface.

The imaging lens system 700 may further include a filter IF, a cover glass CG, an image sensor IP, and a stop ST. The filter IF and the cover glass CG may be sequentially disposed between the ninth lens 790 and the image sensor IP. The stop ST may be disposed between the third lens 730 and the fourth lens 740.

Figure 26:
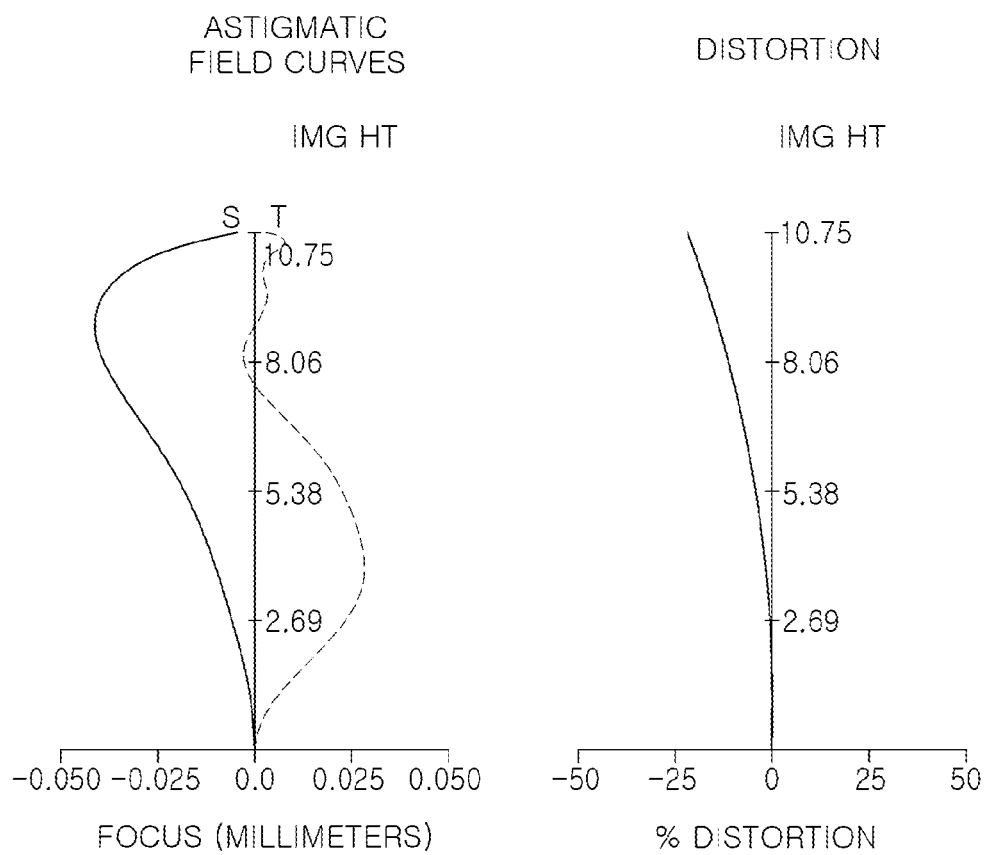
FIG. 26 is a view illustrating aberration curves of the imaging lens system illustrated in FIG. 25.
Figure 27:
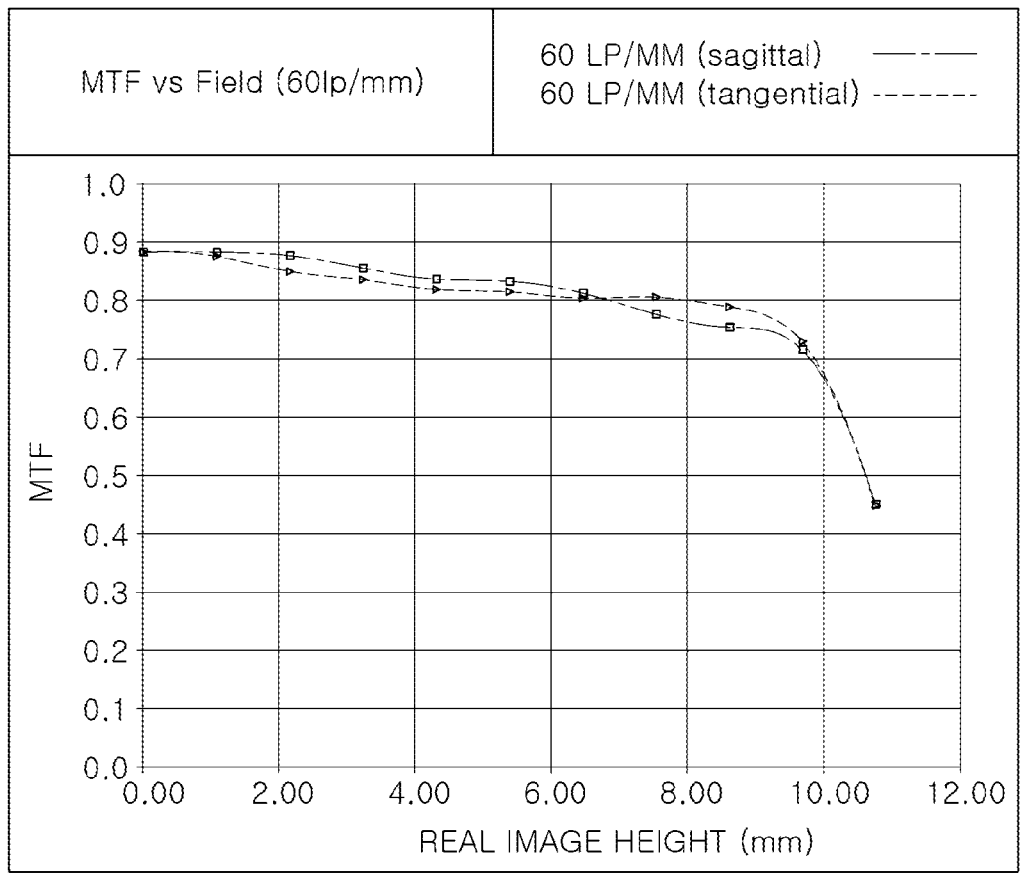
FIG. 27 is a graph illustrating MTF curves of the imaging lens system illustrated in FIG. 25.
Figure 28:
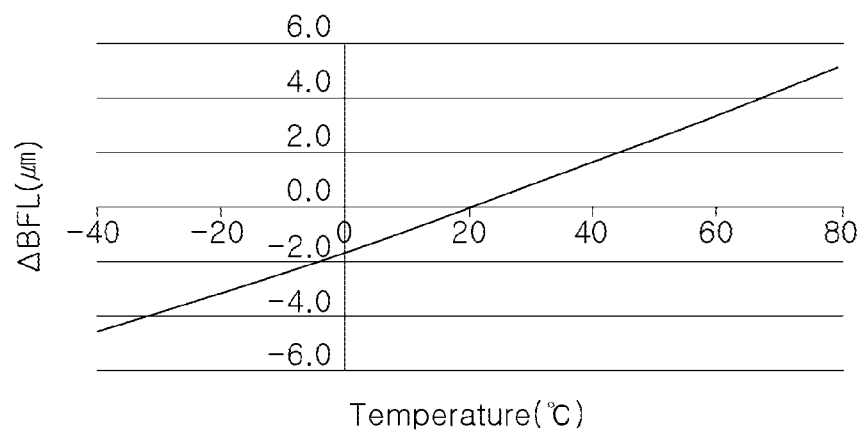
FIG. 28 is a graph illustrating a curve of a BFL depending on a change in temperature of the imaging lens system illustrated in FIG. 25.

FIGS. 26 and 27 illustrate aberration characteristics and MTF characteristics of the imaging lens system 700 according to the seventh example. FIG. 28 illustrates a change in back focal length ΔBFL (μm) of the imaging lens system 700 depending on temperature.

Lens characteristics and aspheric values of the imaging lens system 700 according to the seventh example are listed in Tables 13 and 14. In the seventh example, a temperature compensation lens is a fourth lens having a DTn value of 3.0.

TABLE 13

| Surfaces No. | Note | Radius of Curvature | Thickness/ Distance | Refractive Index | Abbe Number | DTn ($10^{-6}$/° C.) | CTE ($10^{-6}$/° C.) | VT ($10^3$) |
|---|---|---|---|---|---|---|---|---|
| S1 | First Lens | 23.042 | 1.500 | 1.5286 | 76.97 | −8.10 | 8.00 | −43.00 |
| S2 | | 8.997 | 5.112 | | | | | |
| S3 | Second Lens | 60.213 | 1.650 | 1.5365 | 55.91 | −93.30 | 60.00 | −4.00 |
| S4 | | 49.500 | 0.170 | | | | | |
| S5 | Third Lens | 10.775 | 2.605 | 1.6142 | 25.60 | −105.0 | 70.00 | −4.00 |
| S6 | | 8.464 | 1.884 | | | | | |

TABLE 13-continued

| Surfaces No. | Note | Radius of Curvature | Thickness/ Distance | Refractive Index | Abbe Number | DTn ($10^{-6}$/° C.) | CTE ($10^{-6}$/° C.) | VT ($10^3$) |
|---|---|---|---|---|---|---|---|---|
| S7 | Stop | Infinity | −0.247 | | | | | |
| S8 | Fourth lens | 33.278 | 3.997 | 1.7550 | 52.30 | 3.00 | 8.00 | −248.0 |
| S9 | | −19.393 | 0.150 | | | | | |
| S10 | Fifth Lens | 13.017 | 3.832 | 1.5345 | 55.70 | −92.70 | 60.00 | −4.00 |
| S11 | | −23.150 | 0.150 | | | | | |
| S12 | Sixth Lens | −150.000 | 1.294 | 1.6397 | 23.53 | −115.0 | 66.00 | −4.00 |
| S13 | | 11.347 | 1.293 | | | | | |
| S14 | Seventh Lens | 37.426 | 4.200 | 1.5443 | 55.90 | −94.00 | 5.90 | −6.00 |
| S15 | | −15.738 | 1.643 | | | | | |
| S16 | Eighth Lens | 17.949 | 2.100 | 1.5365 | 55.91 | −93.30 | 60.00 | −4.00 |
| S17 | | 9.389 | 0.727 | | | | | |
| S18 | Ninth lens | 17.323 | 2.000 | 1.5365 | 55.91 | −93.30 | 60.00 | −4.00 |
| S19 | | 11.056 | 1.000 | | | | | |
| S20 | Filter | Infinity | 1.100 | 1.5168 | 64.17 | 1.60 | 8.00 | −206.0 |
| S21 | | Infinity | 2.232 | | | | | |
| S22 | Cover Glass | Infinity | 1.100 | 1.5168 | 64.17 | 1.60 | 8.00 | −206.0 |
| S23 | | Infinity | 0.015 | | | | | |
| S24 | Imaging Plane | Infinity | Infinity | | | | | |

TABLE 14

| Surface No. | K | A | B | C | D | E | F |
|---|---|---|---|---|---|---|---|
| S3 | 0 | 6.8189E−04 | −1.8886E−05 | 5.9294E−08 | 1.3735E−09 | — | — |
| S4 | 0 | 1.1406E−03 | −2.4854E−05 | −4.1073E−07 | 1.5399E−08 | — | — |
| S5 | 0 | −5.3490E−04 | 8.2716E−06 | −5.8905E−07 | 1.5206E−08 | — | — |
| S6 | 0 | −1.3153E−03 | 3.1957E−05 | −8.1266E−07 | 1.4750E−08 | — | — |
| S10 | 0 | −2.4660E−04 | −4.5552E−06 | −7.7364E−09 | 1.4599E−09 | — | — |
| S11 | 0 | −9.1466E−04 | 2.9061E−05 | −6.6320E−07 | 5.7966E−09 | — | — |
| S12 | 0 | −7.5196E−04 | 4.2724E−05 | −1.0155E−06 | 7.0893E−09 | — | — |
| S13 | 0 | −4.2305E−04 | 2.1628E−05 | −3.1645E−07 | −1.5741E−09 | — | — |
| S14 | 0 | −2.8195E−04 | 1.3570E−06 | 3.8363E−07 | 1.3415E−10 | −1.35E−10 | — |
| S15 | 0 | −4.1374E−04 | 1.8509E−05 | −3.2555E−07 | 8.9512E−09 | −9.72E−11 | — |
| S16 | 0 | −1.6717E−03 | 1.6434E−05 | 1.3941E−07 | −8.9710E−09 | 8.82E−11 | — |
| S17 | 0 | −1.8312E−03 | 1.7326E−05 | −1.1440E−07 | 3.3047E−10 | −1.93E−12 | — |
| S18 | 0 | −1.9581E−03 | 3.9367E−05 | −3.0992E−07 | 3.6616E−10 | 7.34E−12 | −3.16E−14 |
| S19 | 0 | −1.9962E−03 | 4.4071E−05 | −6.4562E−07 | 5.6467E−09 | −2.68E−11 | 4.36E−14 |

Figure 29:
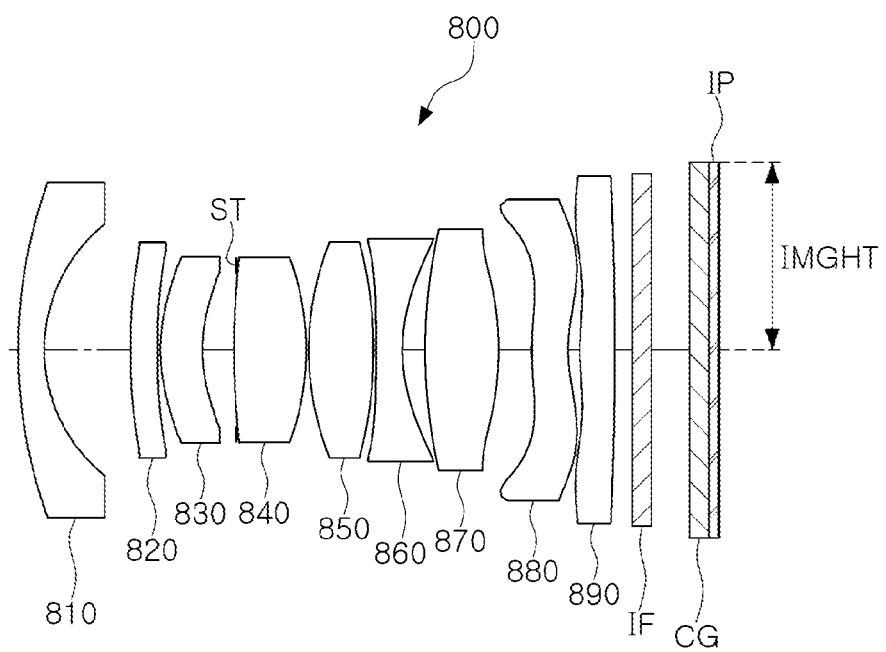
FIG. 29 is a view illustrating an imaging lens system according to an eighth example.

Hereinafter, an imaging lens system 800 according to an eighth example will be described with reference to FIG. 29.

The imaging lens system 800 may include a first lens 810, a second lens 820, a third lens 830, a fourth lens 840, a fifth lens 850, a sixth lens 860, a seventh lens 870, an eighth lens 880, and a ninth lens 890.

The first lens 810 may have negative refractive power, and may have a convex object-side surface and a concave image-side surface. The second lens 820 may have positive refractive power, and may have a convex object-side surface and a concave image-side surface. The third lens 830 may have negative refractive power, and may have a convex object-side surface and a concave image-side surface. The fourth lens 840 may have positive refractive power, and may have a convex object-side surface and a convex image-side surface. The fifth lens 850 may have positive refractive power, and may have a convex object-side surface and a convex image-side surface. The sixth lens 860 may have negative refractive power, and may have a concave object-side surface and a concave image-side surface. The seventh lens 870 may have positive refractive power, and may have a convex object-side surface and a convex image-side surface. The eighth lens 880 may have negative refractive power, and may have a convex object-side surface and a concave image-side surface. The ninth lens 890 may have negative refractive power, and may have a convex object-side surface and a concave image-side surface.

The imaging lens system 800 may further include a filter IF, a cover glass CG, an image sensor IP, and a stop ST. The filter IF and the cover glass CG may be sequentially disposed between the ninth lens 890 and the image sensor IP. The stop ST may be disposed between the third lens 830 and the fourth lens 840.

Figure 30:
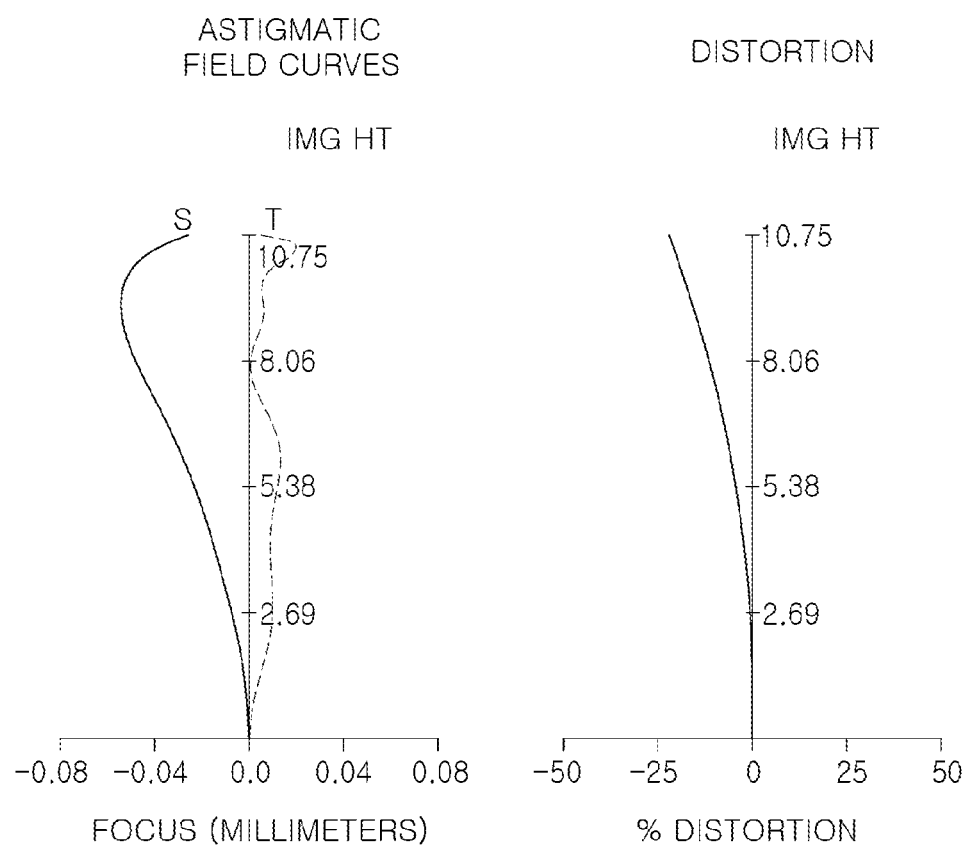
FIG. 30 is a view illustrating aberration curves of the imaging lens system illustrated in FIG. 29.
Figure 31:
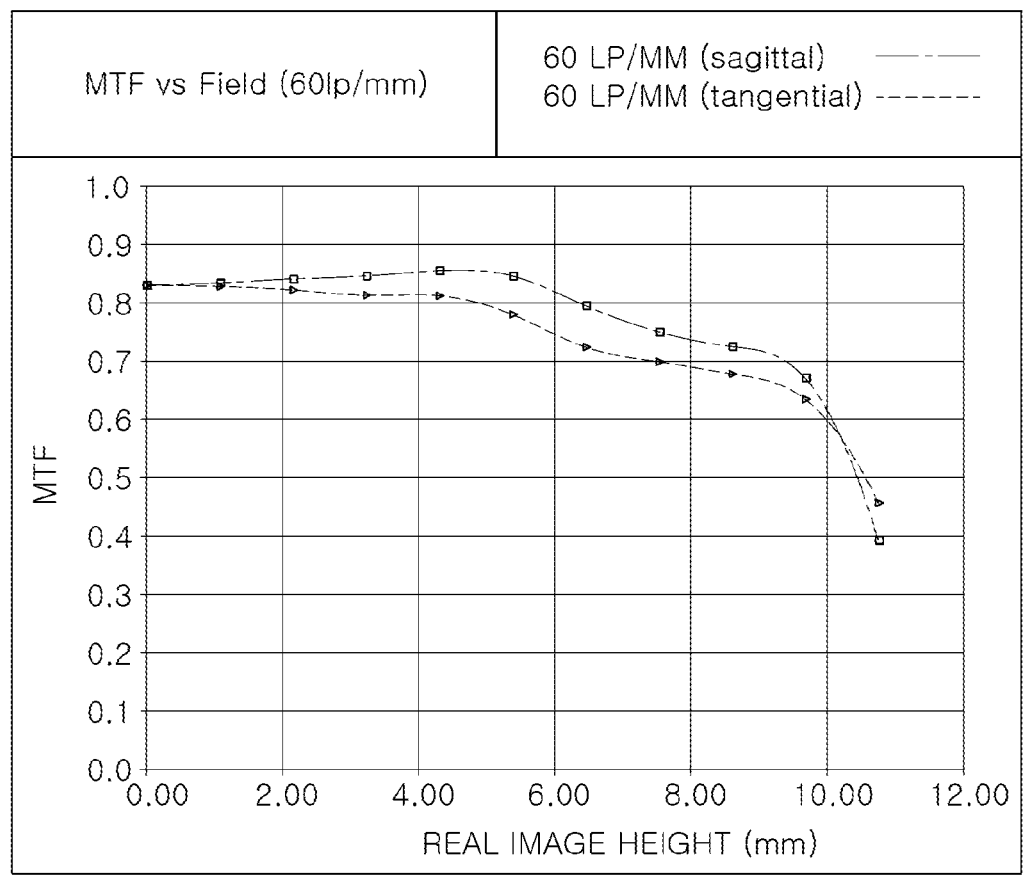
FIG. 31 is graph illustrating MTF curves of the imaging lens system illustrated in FIG. 29.
Figure 32:
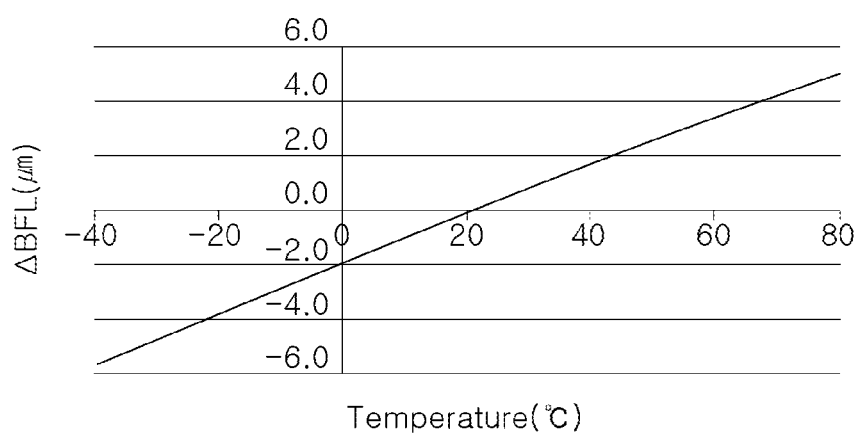
FIG. 32 is a graph illustrating a curve of a BFL depending on a change in temperature of the imaging lens system illustrated in FIG. 29.

FIGS. 30 and 31 illustrate aberration characteristics and MTF characteristics of the imaging lens system 800 according to the eighth example. FIG. 32 illustrates a change in back focal length ΔBFL (μm) of the imaging lens system 800 depending on temperature.

Lens characteristics and aspherical values of the imaging lens system 800 according to the eighth example are listed in Tables 15 and 16. In the eighth example, a temperature compensation lens is a fifth lens having a DTn value of 4.50.

TABLE 15

| Surface No. | Note | Radius of Curvature | Thickness/ Distance | Refractive Index | Abbe Number | DTn (10⁻⁶/° C.) | CTE (10⁻⁶/° C.) | VT (10³) |
|---|---|---|---|---|---|---|---|---|
| S1 | First Lens | 28.113 | 1.500 | 1.5286 | 76.97 | −8.100 | 8.000 | −43.00 |
| S2 | | 9.256 | 4.915 | | | | | |
| S3 | Second Lens | 60.075 | 1.555 | 1.5365 | 55.91 | −93.30 | 60.000 | −4.000 |
| S4 | | 150 | 0.150 | | | | | |
| S5 | Third Lens | 9.675 | 2.401 | 1.6142 | 25.60 | −105.0 | 70.000 | −4.000 |
| S6 | | 8.274 | 1.948 | | | | | |
| S7 | Stop | Infinity | −0.127 | | | | | |
| S8 | Fourth Lens | 48.017 | 4.134 | 1.5365 | 55.91 | −93.300 | 60.000 | −4.000 |
| S9 | | −14.6 | 0.150 | | | | | |
| S10 | Fifth Lens | 16.7 | 3.700 | 1.7725 | 49.50 | 4.500 | 8.000 | −447.0 |
| S11 | | −23.826 | 0.150 | | | | | |
| S12 | Sixth Lens | −119.359 | 1.494 | 1.6397 | 23.53 | −115.0 | 66.000 | −4.000 |
| S13 | | 9.649 | 1.301 | | | | | |
| S14 | Seventh Lens | 40.728 | 4.191 | 1.5443 | 55.90 | −94.000 | 5.900 | −6.000 |
| S15 | | −19.941 | 1.877 | | | | | |
| S16 | Eighth Lens | 15.62 | 2.102 | 1.5365 | 55.91 | −93.30 | 60.000 | −4.000 |
| S17 | | 9.345 | 0.682 | | | | | |
| S18 | Ninth Lens | 15.374 | 2.000 | 1.5365 | 55.91 | −93.30 | 60.000 | −4.000 |
| S19 | | 11.379 | 1.000 | | | | | |
| S20 | Filter | Infinity | 1.100 | 1.5168 | 64.17 | 1.600 | 8.000 | −206.0 |
| S21 | | Infinity | 2.167 | | | | | |
| S22 | Cover Glass | Infinity | 1.100 | 1.5168 | 64.17 | 1.600 | 8.000 | −206.0 |
| S23 | | Infinity | 0.016 | | | | | |
| S24 | Imaging Plane | Infinity | Infinity | | | | | |

TABLE 16

| Surface No. | K | A | B | C | D | E | F |
|---|---|---|---|---|---|---|---|
| S3 | 0 | 7.1437E-04 | −2.0842E-05 | 1.6031E-07 | −1.7180E-10 | — | — |
| S4 | 0 | 1.0001E-03 | −3.7579E-05 | 6.0728E-07 | −2.0351E-09 | — | — |
| S5 | 0 | −5.9730E-04 | −4.8929E-06 | 3.0177E-07 | 1.5933E-09 | — | — |
| S6 | 0 | −1.2065E-03 | 2.6722E-05 | −6.5204E-07 | 1.7565E-08 | — | — |
| S8 | 0 | −4.6442E-05 | 1.3070E-06 | — | — | — | — |
| S9 | 0 | 2.0741E-04 | −4.4866E-06 | 5.8360E-08 | −2.7650E-09 | — | — |
| S12 | 0 | −1.4936E-04 | 3.8731E-07 | −9.6241E-08 | 8.8747E-10 | — | — |
| S13 | 0 | −4.5490E-04 | 7.4718E-06 | −9.4522E-08 | −1.1131E-09 | — | — |
| S14 | 0 | −2.7797E-05 | 2.3356E-06 | 2.7937E-07 | −5.7738E-09 | 2.30E-12 | — |
| S15 | 0 | −5.2475E-04 | 2.3729E-05 | −4.0579E-07 | 7.8094E-09 | −7.57E-11 | — |
| S16 | 0 | −1.7388E-03 | 1.6308E-05 | 1.9461E-07 | −1.0301E-08 | 9.71E-11 | — |
| S17 | 0 | −1.9850E-03 | 1.9144E-05 | −3.7658E-08 | −1.7159E-09 | 1.12E-11 | — |
| S18 | 0 | −2.2531E-03 | 4.7094E-05 | −4.3057E-07 | 1.4452E-09 | 1.29E-12 | −1.07E-14 |
| S19 | 0 | −2.1247E-03 | 5.2025E-05 | −8.7394E-07 | 9.0587E-09 | −5.21E-11 | 1.19E-13 |

An imaging lens system according to the present disclosure may generally have optical characteristics, as follows. For example, a total track length (TTL) of the imaging lens system may be determined within a range of 35 mm to 45 mm, a total focal length f may be determined within a range of 12 mm to 16 mm, and a focal length f1 of a first lens may be determined within a range of −32 mm to −15 mm, a focal length f2 of a second lens may be determined within a range of 15 mm or more or −500 mm or less, a focal length f3 of a third lens may be determined within a range of −290 mm to −35 mm, a focal length f4 of a fourth lens may be determined within a range of 8.0 mm to 24 mm, a focal length f5 of a fifth lens may be determined within a range of 11 mm to 110 mm, a focal length f6 of a sixth lens may be determined within a range of −18 mm to −11 mm, a focal length f7 of a seventh lens may be determined within a range of 15 mm to 35 mm, a focal length f8 of the eighth lens may be determined within a range of 15 mm or more or −30 mm or less, and a focal length f9 of a ninth lens may be determined within a range of −110 mm to −10 mm.

Optical characteristics of the imaging lens systems according to the first to eighth examples are listed in Table 17.

TABLE 17

| Note | First Example | Second Example | Third Example | Fourth Example | Fifth Example | Sixth Example | Seventh Example | Eighth Example |
|---|---|---|---|---|---|---|---|---|
| TTL | 39.5000 | 39.5050 | 39.5040 | 39.5090 | 31.9210 | 39.4980 | 39.5070 | 39.5060 |
| BFL | 5.4510 | 5.4820 | 5.5350 | 5.4300 | 5.3490 | 5.4520 | 5.4470 | 5.3830 |
| f | 14.0800 | 14.0400 | 14.0900 | 14.0000 | 13.9100 | 13.9800 | 14.0500 | 14.0700 |
| IMG HT | 10.7500 | 10.7500 | 10.7500 | 10.7500 | 10.7500 | 10.7500 | 10.7500 | 10.7500 |
| f1 | −27.8256 | −28.7362 | −27.7540 | −28.7420 | −18.3418 | −23.4649 | −28.9943 | −26.8438 |
| f2 | 401.1862 | 1209.1158 | 182.2773 | 136.4012 | 17.5541 | 102.6989 | −548.0522 | 185.6609 |
| f3 | −111.1036 | −111.2609 | −108.1577 | −64.4712 | −44.9672 | −171.1728 | −112.5056 | −267.3928 |
| f4 | 15.3890 | 15.1750 | 15.6369 | 17.2241 | 11.0714 | 21.2668 | 16.7764 | 21.3607 |
| f5 | 18.2085 | 18.2022 | 16.1614 | 17.2835 | 105.7223 | 14.6678 | 16.1858 | 13.2364 |
| f6 | −15.8324 | −15.8201 | −12.6680 | −13.1806 | −14.8937 | −14.5555 | −16.4391 | −13.8927 |
| f7 | 21.8072 | 21.5547 | 30.1567 | 18.3665 | 17.0629 | 21.3752 | 20.9378 | 25.2081 |
| f8 | −43.6109 | −43.2837 | 18.3756 | 2248.3469 | −200.2854 | −54.3540 | −40.1337 | −49.1020 |
| f9 | −76.6626 | −76.3300 | −12.4494 | −27.6731 | −22.5344 | −65.0528 | −64.1063 | −98.9116 |
| f45 | 8.8400 | 8.8000 | 8.5400 | 9.2300 | 10.5100 | 9.1500 | 8.7600 | 8.5500 |

Conditional expression values of the imaging lens systems according to the first to eighth examples are listed in Table 18.

TABLE 18

| Conditional Expression | First Example | Second Example | Third Example | Fourth Example | Fifth Example | Sixth Example | Seventh Example | Eighth Example |
|---|---|---|---|---|---|---|---|---|
| \|DTnF/(DTnC*10)\| | 4.6977 | 4.6977 | 4.2045 | 4.3267 | 4.0733 | 6.8545 | 6.8800 | 6.6600 |
| \|DTnR/(DTnC*10)\| | 11.0955 | 11.0955 | 11.0955 | 10.8489 | 10.8356 | 11.0955 | 16.2767 | 8.7911 |
| DTnF/DTnR | 0.4234 | 0.4234 | 0.3789 | 0.3988 | 0.3759 | 0.6178 | 0.4227 | 0.7576 |
| f/IMGHT | 1.3098 | 1.3060 | 1.3107 | 1.3023 | 1.2940 | 1.3005 | 1.3070 | 1.3088 |
| f/fc | 0.9149 | 0.9252 | 0.9011 | 0.8128 | 1.2564 | 0.6574 | 0.8375 | 1.630 |

As described above, the present disclosure may provide an imaging lens system, capable of implementing constant optical characteristics even in high or low temperature environments.

While specific examples have been illustrated and described above, it will be apparent after gaining an understanding of this disclosure that various changes in form and details may be made in these examples without departing from the spirit and scope of the claims and their equivalents. The examples described herein are to be considered in a descriptive sense only, and are not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An imaging lens system comprising:
   a first lens, a second lens, a third lens, a fourth lens, a fifth lens, a sixth lens, a seventh lens, an eighth lens, and a ninth lens disposed in order from an object side,
   wherein the first lens has negative refractive power,
   wherein the fourth lens is a temperature compensation lens having positive refractive power and having an absolute value of a refractive index temperature coefficient of 10 ($10^{-6}$/° C.) or less,
   wherein the fourth lens has a greater refractive index than other lenses,
   wherein the eighth lens has a concave image-side surface in a paraxial region,
   wherein the ninth lens has negative refractive power and a concave image-side surface, and
   wherein the imaging lens system comprises a total of nine lenses with refractive power.

2. The imaging lens system of claim 1, further comprising:
   a stop disposed between the third lens and the fourth lens.

3. The imaging lens system of claim 2, wherein the fourth lens is disposed on an image side of the stop.

4. The imaging lens system of claim 1, wherein the fourth lens and the fifth lens each have a refractive index temperature coefficient of less than −80 ($10^{-6}$/° C.).

5. The imaging lens system of claim 1, wherein the third lens has negative refractive power.

6. The imaging lens system of claim 1, wherein $$f45 < f,$$

where f45 is a composite focal length of the fourth lens and the fifth lens, and f is a focal length of the imaging lens system.

7. The imaging lens system of claim 1, wherein the seventh lens has a convex image-side surface.

8. The imaging lens system of claim 1, wherein the eighth lens has a convex object-side surface.

9. An imaging lens system comprising:
   a first lens, a second lens, a third lens, a fourth lens, a fifth lens, a sixth lens, a seventh lens, an eighth lens, and ninth lens, disposed in order from an object side, and a stop disposed between the first lens and the ninth lens, wherein the fourth lens has positive refractive power and has a greater refractive index than other lenses, wherein 0<fstp12<f, where fstp12 is a composite focal length of two lenses continuously disposed on an image side of the stop, and f is a focal length of the imaging lens system.

10. The imaging lens system of claim 9, wherein the stop is disposed between the third lens and the fourth lens.

11. The imaging lens system of claim 9, wherein the first lens is a temperature compensation lens having positive refractive power and having an absolute value of a refractive index temperature coefficient of 10 ($10^{-6}$/° C.) or less.

12. The imaging lens system of claim 11, wherein the temperature compensation lens has a refractive index of 1.7 or more.

13. The imaging lens system of claim 11, wherein $$4.0<|DTnF/(DTnC*10)|<7.0,$$

where DTnF is a sum of refractive index temperature coefficients of lenses disposed on an object side of the temperature compensation lens, and DTnC is a refractive index temperature coefficient of the temperature compensation lens.

14. The imaging lens system of claim 11, wherein $$8.0<|DTnR/(DTnC*10)|<18,$$

where DTnR is a sum of refractive index temperature coefficients of lenses disposed on an image side of the temperature compensation lens, and DTnC is a refractive index temperature coefficient of the temperature compensation lens.

15. The imaging lens system of claim 9, wherein the first lens has negative refractive power.

* * * * *